() United States Patent (10) Patent No.: US 9,392,543 B2
Senga et al. (45) Date of Patent: Jul. 12, 2016

(54) WIRELESS COMMUNICATION SYSTEM, DATA TRANSMITTER APPARATUS, DATA WIRELESS RECEIVER APPARATUS, AND WIRELESS COMMUNICATION METHOD

(75) Inventors: Satoshi Senga, Osaka (JP); Takayuki Nishikawa, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 214 days.

(21) Appl. No.: 13/821,345

(22) PCT Filed: Sep. 22, 2011

(86) PCT No.: PCT/JP2011/005337
§ 371 (c)(1),
(2), (4) Date: Mar. 7, 2013

(87) PCT Pub. No.: WO2012/046402
PCT Pub. Date: Apr. 12, 2012

(65) Prior Publication Data
US 2013/0163498 A1 Jun. 27, 2013

(30) Foreign Application Priority Data
Oct. 7, 2010 (JP) .................................. 2010-227692

(51) Int. Cl.
*G08C 17/00* (2006.01)
*H04W 52/02* (2009.01)
(Continued)

(52) U.S. Cl.
CPC ........... *H04W 52/0212* (2013.01); *H04L 1/187* (2013.01); *H04L 1/1854* (2013.01);
(Continued)

(58) Field of Classification Search
CPC ............. H04W 52/0212; H04W 80/06; H04L 69/161; H04L 1/1877; H04L 1/187; H04L 1/188; H04L 1/1887; H04L 1/1854
USPC ........................................................ 370/311
See application file for complete search history.

(56) References Cited
U.S. PATENT DOCUMENTS

2005/0190693 A1* 9/2005 Jinzaki ................. H04L 1/1887
370/229
2006/0034286 A1* 2/2006 Koning ................ H04L 69/163
370/394
(Continued)

FOREIGN PATENT DOCUMENTS

CN 101449521 A 6/2009
JP 2008-508817 A 3/2008
(Continued)

OTHER PUBLICATIONS

WMM Power Save for Mobile and Portable Wi-Fi Certified Devices, Wi-Fi Alliance Dec. 2005, (p. 7-p. 12).
(Continued)

*Primary Examiner* — Dang Ton
*Assistant Examiner* — Abdeltif Ajid
(74) *Attorney, Agent, or Firm* — Pearne & Gordon LLP

(57) ABSTRACT

A transport header analyzing unit (133) analyzes, on the basis of the TCP header of transport data transmitted from a transmitter terminal (100) to a receiver terminal (200), whether the transport data is an acknowledgement response in a TCP communication. If the transport data is not an acknowledgement response, a synchronization pre-processing unit (134) determines, on the basis of the TCP header of the transport data, whether synchronization information, which is required to operate in a power saving mode together with an access point (300), is added to the IP header of the transport data. A synchronization information processing unit (235) adds, to the IP header of the transport data indicating an acknowledgement response to received data that is received from the transmitter terminal (100), the synchronization information that is required to operate in the power saving mode together with the access point (300).

14 Claims, 16 Drawing Sheets

(51) Int. Cl.
  *H04W 80/06* (2009.01)
  *H04L 29/06* (2006.01)
  *H04L 1/18* (2006.01)
(52) U.S. Cl.
  CPC ............ *H04L1/1877* (2013.01); *H04L 1/1887* (2013.01); *H04L 69/161* (2013.01); *H04W 80/06* (2013.01); *H04L 1/188* (2013.01); *Y02B 60/43* (2013.01); *Y02B 60/50* (2013.01)

(56) References Cited

U.S. PATENT DOCUMENTS

2007/0293218 A1* 12/2007 Meylan ............. H04W 74/0816
                                                           455/434

2008/0259837 A1* 10/2008 Thoukydides ................ 370/311

FOREIGN PATENT DOCUMENTS

JP    2009-088914 A    4/2009
JP    2009-538574 A    11/2009

OTHER PUBLICATIONS

IEEE Standard for Information technology—Telecommunications and information exchange between systems—Local and metropolitan area networks—Specific requirements 802.11e-2005, (11.2 Power management).

International Search Report for PCT/JP2011/005337 dated Dec. 20, 2011.

* cited by examiner

| SEQUENCE NUMBER | PRESENCE OR ABSENCE OF SYNCHRONIZATION INFORMATION |
|---|---|
| 1 | PRESENT |
| 2 | ABSENT |
| ... | ... |
| n | ABSENT |
| n+1 | ABSENT |

FIG. 10

WIRELESS COMMUNICATION SYSTEM, DATA TRANSMITTER APPARATUS, DATA WIRELESS RECEIVER APPARATUS, AND WIRELESS COMMUNICATION METHOD

TECHNICAL FIELD

The present invention relates to a wireless communication system, a data transmitting apparatus, a data wireless receiving apparatus and a wireless communication method aiming at power saving.

BACKGROUND ART

As network connection devices, there are devices using a wired IP (Internet Protocol) network and devices using a wireless IP network. Power-saving techniques for reducing power consumption are under study for various devices, irrespective of above-described wired or wireless devices. Since wireless portable type terminals among such devices are expected to be used in such a manner that they are operated only by a built-in battery for many hours, a power-saving technique is particularly necessary. Therefore, examples of power-saving techniques for portable terminals will be described below.

As network connection devices of portable terminals, attention is being focused on the use of wireless LAN (Local Area Network) devices. Wireless LAN devices consume relatively large power. Therefore, power saving is an important issue to be studied for wireless LAN devices and many power-saving techniques are being proposed.

In IEEE802.11, which is a wireless LAN standard specification, a power management mode (power-saving mode) is defined as a power-saving method for a wireless LAN terminal provided with a wireless LAN device. According to this method, a wireless LAN terminal operating in a power-saving mode transitions to a normal transmission/reception operation state (active mode) according to timing at which a beacon is transmitted from a wireless base station, which is an access point, and performs reception operation. The wireless LAN terminal then enters a state in which it does not perform reception operation for a period during which no beacon is transmitted from the wireless base station (hereinafter, referred to as "power-saving mode"). In the power-saving mode (also referred to as "doze mode"), the wireless LAN terminal stops power supply to a wireless LAN device provided for the wireless LAN terminal, and can thereby reduce power consumption of the wireless LAN terminal.

When a wireless LAN terminal operating in a power-saving mode is connected to such a wireless LAN system, an access point increases a period during which a beacon is transmitted (beacon period) and the number of intermissions of beacons until a DTIM beacon is transmitted. Here, the DTIM (Delivery Traffic Indication Message) beacon is a message that transmits to the wireless LAN terminal in the power-saving mode the fact that data is queued for transmission. This allows a power saving effect to be expected from the wireless LAN terminal.

However, when a long beacon period is set, a large delay time is generated in the reception of unicast data.

For example, Wi-Fi WMM-APSD (WMM Power Save (see NPL 1)) and a U-APSD (Unscheduled Automatic Power-Save Delivery) scheme in the IEEE802.11e standard (IEEE Std 802.11e-2005 (see NPL 2)) are known as methods to solve this problem. These two standards define a method of realizing power saving for unicast data. The method uses a method for transitioning to an active mode independently of a beacon period in consideration of priority control for each application, and delay and range of fluctuation to maintain communication quality of the application. This allows the wireless LAN terminal to realize power saving for unicast data.

The wireless LAN terminal using this method transitions from a doze mode to an active mode to maintain communication quality for each application at its own transmission/reception period. The wireless LAN terminal that has transitioned to the active mode requests the access point to transmit unicast data directed to the wireless LAN terminal.

To be more specific, the Wi-Fi WMM-APSD switches to the active mode at an interval determined between the access point and the wireless LAN terminal to transmit/receive data. As the method of dynamically determining the interval at which switching is made to the active mode (e.g., PTL 1), a method is proposed whereby a wireless LAN terminal analyzes communication data resulting from communication with an access point. The wireless LAN terminal detects communication with the access point or a state of a communication protocol. The wireless LAN terminal determines the interval at which communication data is received from the access point by referencing a reception interval table prepared beforehand for each state according to the communication or the state of the communication protocol.

Furthermore, the U-APSD receives data triggered by a trigger frame transmitted from a wireless LAN terminal in a power-saving mode. The trigger frame is created as follows.

FIG. 1 is a diagram illustrating a data format of transmission data used in a network layer of a wireless LAN terminal. As shown in FIG. 1, the transmission data includes an IP header and IP data. Furthermore, the IP data includes a TCP (Transmission Control Protocol) header and TCP data. Here, when the transmission data is an acknowledgment response, the TCP data is empty. On the other hand, when the transmission data is application data, the TCP data is data such as streaming data. It is possible to identify whether the transmission data is an acknowledgment response or application data by monitoring the data size of the TCP data.

FIG. 2 is a diagram illustrating details of the TCP header. In FIG. 2, a "sequence number" field is a field indicating a sequence number of the transmission data. An "acknowledgment response number" field is a field used when the transmission data is an acknowledgment response. The "acknowledgment response number" field stores a sequence number stored in the "sequence number" field in the TCP header of received data targeted for an acknowledgment response. Furthermore, a "flag" field is a field that stores SYN (Synchronize) or FIN (Fines) data or the like. Here, the SYN data indicates a request for starting TCP communication and the FIN data indicates a request for ending TCP communication. Furthermore, a "window size" field is used to transmit a window size on the receiving side to the other party. When the window size is 0, this indicates that data cannot be received. Thus, by monitoring the TCP header, it is possible to confirm whether the transmission data is an acknowledgment response or application data.

Furthermore, FIG. 3 is a diagram illustrating details of the IP header. In FIG. 3, a "service type" field is a filed used to specify TOS (Type Of Service) indicating the priority or the like of an ITP packet. The U-APSD classifies packets from a higher layer into access categories and stores the packets in their respective queues. There are four access categories; "speech," "video," "best effort" and "background," and the access categories used are determined by an application. In the case of, for example, streaming communication, "video" is set as the access category. The access categories are associated with their respective priorities. For this reason, the access categories are used in priority control of a wireless LAN. The wireless LAN terminal using the U-APSD adds information indicating the access category to the "service type" field of the IP header of transmission data as synchronization information and transfers the field to the wireless LAN device.

Upon receiving the transmission data with synchronization information added to the "service type" field of the IP header of the transmission data, the wireless LAN device rewrites the wireless header as a U-APSD-compatible wireless frame. FIG. 4 is a diagram illustrating a data format used in a wireless LAN device using the U-APSD, that is, data link layer. Thus, when synchronization information is added to the IP header, the wireless LAN terminal generates a trigger frame by rewriting the wireless header to a U-APSD-compatible header. The frame generated is then recognized as a U-APSD-compatible trigger frame in communication with the access point.

The wireless LAN terminal using the U-APSD is usually in a doze mode and is switched to an active mode only when there is data to be transmitted. When, for example, the wireless LAN terminal is in the doze mode, even if there is U-APSD-compatible data addressed to the wireless LAN terminal at the access point, the access point cannot transmit the data to the wireless LAN terminal. Therefore, the data remains stored in a buffer of the access point.

When data addressed to the access point is generated in the wireless LAN terminal, the wireless LAN terminal is switched to the active mode and transmits data to the access point as U-APSD-compatible data. At this time, the access point knows that the wireless LAN terminal has entered the active mode and transmits the data stored in the buffer to the wireless LAN terminal. After that, the wireless LAN terminal transitions to the doze mode again.

Thus, the wireless LAN terminal continues a reception operation in an awake (transitioned to the active mode) state for data transmission, and can thereby perform transmission/reception simultaneously through one rising. When the data that has arrived at the access point is not U-APSD-compatible data, the wireless LAN terminal performs a normal reception operation in conformity with the operation in the power-saving mode or the like.

CITATION LIST

Patent Literature

PTL 1
Japanese Patent Application Laid-Open No. 2009-88914

Non-Patent Literature

NPL 1
WMM Power Save for Mobile and Portable Wi-Fi CERTIFIED Devices, Wi-Fi Alliance December 2005, (P7-P12)
NPL 2
IEEE Std 802.11e-2005, (11.2 Power management)

SUMMARY OF INVENTION

Technical Problem

However, the prior art adopts a scheme in which between the wireless LAN terminals on the transmitting side and on the receiving side, timing of transmitting respective data is optimized to the same application (e.g., UDP communication such as VoIP (Voice over IP)). Therefore, adapting the prior art to an application using TCP communication (e.g., streaming reception such as video speech) just as it is involves problems as shown below.

FIG. 5 is a diagram illustrating the above-described problems. To be more specific, suppose a case where since transmission and reception are simultaneously performed between receiving terminal 20 using the U-APSD and access point 30, there is not any trigger frame for synchronization. In the case of TCP, an acknowledgment response (ACK) transmitted from receiving terminal 20 to access point 30 becomes a trigger frame. When there is no trigger frame, U-APSD-compatible data arriving at the access point from transmitting terminal 10 is then stored in access point 30. The data remains stored in access point 30 all the while until some trigger frame (transmission data) arrives at access point 30 from receiving terminal 20. Therefore, when there is no trigger frame, there is a problem that receiving terminal 20 may not be able to receive data from transmitting terminal 10.

Furthermore, there is a problem shown below in a specific state of TCP communication (communication start phase and end phase). For example, in TCP communication, the transmitting terminal cannot transmit subsequent data to the receiving terminal until the transmitting terminal receives ACK in response to data of a start request and confirms that a link has been established. Thus, TCP communication involves a state in which only one-directional communication data from the transmitting terminal to the receiving terminal is generated as in the case of the above-described specific state. Thus, for a period during which a specific state is realized, there is a problem that it is difficult to apply the U-APSD in TCP communication.

It is an object of the present invention to efficiently make a transition to a power-saving mode without stopping a data flow even when using a U-APSD in TCP communication.

Solution to Problem

An aspect of a wireless communication system according to the present invention is a wireless communication system including: a data transmitting apparatus on a transmitting side; a wireless base station that performs wired or wireless communication with the data transmitting apparatus; and a data wireless receiving apparatus on a receiving side that TCP/IP-communicates transmission/received data including an IP header and a TCP header with the data transmitting apparatus via the wireless base station using a TCP/IP protocol, in which: the data transmitting apparatus includes: a transmission header analyzing section that analyzes, based on a TCP header of first transmission data transmitted from the data transmitting apparatus to the data wireless receiving apparatus, whether or not the first transmission data is an acknowledgment response in TCP communication; a synchronization preprocessing section that determines, when the first transmission data is other than an acknowledgment response, whether or not to add to the IP header of the first transmission data, synchronization information necessary to operate with the wireless base station in a power-saving mode based on the TCP header of the first transmission data; and a transmission data transfer section that transfers the first transmission data including the IP header with the synchronization information added, and the data wireless receiving apparatus includes: a synchronization information processing section that adds synchronization information necessary to operate with the wireless base station in a power-saving mode to an IP header of second transmission data indicating an acknowledgment response for the received data received from the data transmitting apparatus, among transmission data transmitted from the data wireless receiving apparatus to the data transmitting apparatus; a received data decision section that decides whether or not the synchronization information has been added to the IP header of the received data; a transmission timing adjusting section that controls transfer timing of the second transmission data according to a decision result in the received data decision section; and a transmission data transfer section that transfers the second transmission data according to the transfer timing.

According to this configuration, the transmitting terminal side can determine whether or not to add synchronization information to transmission data according to various communication states of TCP communication. This allows the transmitting terminal side to cause the access point to temporarily receive data from the transmitting terminal as U-APSD non-compatible data. As a result, the receiving terminal can avoid a situation in which it is difficult to receive data from the buffer of the access point, that is, interruption (deadlock) of a communication data flow.

Furthermore, since synchronization information is added to the acknowledgment response which becomes a trigger frame for reliably extracting transmission data, the receiving terminal can receive all data from the transmitting terminal stored in the access point. Furthermore, also when synchronization information is not added to the received data which becomes a TCP acknowledgment response target and the transmission data from the transmitting terminal may remain stored in the access point, the receiving terminal immediately transmits an acknowledgment response to which synchronization information has been added. This allows the receiving terminal to reliably receive transmission data which may have been stored but may not have been extracted.

An aspect of a data transmitting apparatus according to the present invention is a data transmitting apparatus on a transmitting side that TCP/IP-communicates transmission/received data including an IP header and a TCP header with a data wireless receiving apparatus via wired or wireless communication with a wireless base station using a TCP/IP protocol, including: a transmission header analyzing section that analyzes whether or not the transmission data is an acknowledgment response in TCP communication based on the TCP header of the transmission data transmitted from the data transmitting apparatus to the data wireless receiving apparatus; a synchronization preprocessing section that determines, when the transmission data is other than an acknowledgment response, whether or not to add synchronization information necessary to operate with the wireless base station in a power-saving mode to the IP header of the transmission data, based on the TCP header of the transmission data; and a transmission data transfer section that transfers the transmission data including the IP header with the synchronization information added.

According to this configuration, the transmitting terminal side can determine whether or not to add synchronization information to transmission data according to various communication states of TCP communication. This allows the transmitting terminal side to cause the access point to temporarily receive data from the transmitting terminal as U-APSD non-compatible data. As a result, the receiving terminal can avoid a situation in which it is difficult to receive data from the buffer of the access point, that is, interruption (deadlock) of a communication data flow.

Another aspect of the data transmitting apparatus according to the present invention further includes: a monitoring section that monitors a reception interval of an acknowledgment response transmitted from the data wireless receiving apparatus; and a transmission data synchronization determining section that finally determines to add the synchronization information when the reception interval is periodic.

According to this configuration, when an acknowledgment response is periodically received from the receiving terminal in response to the normal TCP transmission data, the transmitting terminal can decide that the TCP communication state is stable, and can thereby cause the receiving terminal to periodically transition to a power-saving mode. Here, the normal TCP transmission data is data in other than a communication start phase or an end phase, and data in other than a congestion avoidance phase. This allows the receiving terminal to secure a period for transitioning to a power-saving mode and reduce power consumption without interrupting the data flow.

In a further aspect of the data transmitting apparatus of the present invention, the monitoring section further monitors a window size notified using the TCP header of the received data, and the transmission data synchronization determining section finally determines, when the reception interval is irregular, whether or not to add the synchronization information according to a result of comparison between the notified window size and an initial value of the window size notified with SYN data indicating a request for starting TCP communication.

According to this configuration, even in a state in which an acknowledgment response is not periodically received from the receiving terminal, the transmitting terminal can decide whether or not communication per se is being performed without delay by monitoring the window size of the receiving terminal. When there is little space in the window of the receiving terminal, it is assumed that transmission data has arrived at the receiving terminal and is being processed. That is, in a state in which there is little space in the window size, it is assumed that there is a high possibility that communication per se may be performed without delay and there is a high possibility that packets may not have been stored in the access point. Therefore, the transmitting terminal adds synchronization information to the IP header of transmission data and transfers the transmission data, and the receiving terminal can thereby appropriately secure the period for transitioning to a power-saving mode while maintaining this state and reduce power consumption.

In a still further aspect of the data transmitting apparatus of the present invention, the transmission data synchronization determining section further uses the reception of an acknowledgment response transmitted from the data wireless receiving apparatus as a trigger and determines not to add the synchronization information to an IP header of leading transmission data among a plurality of items of transmission data to be transmitted.

According to this configuration, the transmitting terminal periodically transmits transmission data with no synchronization information added to the IP header to the receiving terminal. Thus, the transmission data transferred with no synchronization information added is not stored in the access point but arrives at the receiving terminal at timing of a beacon period. As a result, even when there is no more trigger frame (TCP acknowledgment response) during which synchronization is established for simultaneously performing transmission and reception between the receiving terminal using the U-APSD and the access point, the transmission data arrives at the receiving terminal just as it is. Thus, the receiving terminal adds synchronization information to an acknowledgment response for this transmission data, transmits the acknowledgment response, and can thereby periodically and reliably acquire data stored in the access point thereafter.

In a still further aspect of the data transmitting apparatus of the present invention, the synchronization preprocessing section determines, when the transmission data is SYN or FIN data indicating a request for starting or ending TCP communication, not to add the synchronization information.

According to this configuration, in a communication start phase and an end phase in TCP communication, normal TCP communication can be performed without applying the U-APSD mode. Thus, for the periods of the start phase and the end phase, the transmitting terminal side can follow the TCP constraint of waiting for ACK data before transmitting the next data. That is, for a specific period requiring reception of ACK data, it is possible to avoid the U-APSD mode from being applied and apply the U-APSD mode after the specific period. As a result, even in the case of TCP communication, it is possible to avoid data from remaining stored in the access point and the receiving terminal can transition to the power-saving mode.

In a still further aspect of the data transmitting apparatus of the present invention, the synchronization preprocessing section further determines not to add the synchronization information in the case of a congestion avoidance phase of TCP communication.

According to this configuration, the receiving terminal immediately transmits an acknowledgment response without transitioning to the power-saving mode. This allows the transmitting terminal to end the TCP congestion avoidance phase which is executed at the time of packet loss at an early stage, return to a normal TCP communication state and avoid a useless reduction of the transfer rate.

In a still further aspect of the data transmitting apparatus of the present invention, the synchronization preprocessing section further determines not to add the synchronization information in the case where the transmission data is transmission data by retransmission of TCP communication.

According to this configuration, since the receiving terminal side immediately transmits an acknowledgment response corresponding to the retransmitted transmission data without transitioning to the power-saving mode, it is possible to avoid a useless reduction of the transfer rate.

An aspect of a data wireless receiving apparatus of the present invention is a data wireless receiving apparatus on a receiving side that TCP/IP-communicates transmission/received data including an IP header and a TCP header with a data transmitting apparatus on a transmitting side via a wireless base station carrying out wired or wireless communication with the data transmitting apparatus using a TCP/IP protocol, including: a synchronization information processing section that adds synchronization information necessary to operate with the wireless base station in a power-saving mode to an IP header of acknowledgment response transmission data indicating an acknowledgment response to the received data received from the data transmitting apparatus among transmission data transmitted from the data wireless receiving apparatus to the data transmitting apparatus; a received data decision section that decides whether or not the synchronization information has been added to the IP header of the received data; a transmission timing adjusting section that controls transfer timing of the acknowledgment response transmission data according to a decision result in the received data decision section; and a transmission data transfer section that transfers the acknowledgment response transmission data including the IP header with the synchronization information added according to the transfer timing.

According to this configuration, the receiving terminal adds synchronization information to the acknowledgment response which becomes a trigger frame for reliably extracting transmission data, and can thereby receive all data from the transmitting terminal stored in the access point. Even if synchronization information has not been added to received data which is a target of the TCP acknowledgment response and transmission data from the transmitting terminal may remain stored in the access point, the receiving terminal immediately transmits an acknowledgment response with synchronization information added. This allows the receiving terminal to reliably receive transmission data that may have been stored but may not have been extracted.

In another aspect of the data wireless receiving apparatus of the present invention, the transmission timing adjusting section immediately transfers, when the synchronization information has not been added to the IP header of the received data, the acknowledgment response transmission data including the IP header with the synchronization information added.

According to this configuration, in the case where synchronization information may not have been added to received data which is the target of the TCP acknowledgment response and transmission data may remain stored in the access point, the receiving terminal immediately transmits an acknowledgment response with synchronization information added. This allows the receiving terminal to reliably receive transmission data which may have been stored but may not have been extracted.

In a further aspect of the data wireless receiving apparatus of the present invention, when the synchronization information has been added to the IP header of the received data, the transmission timing adjusting section delays transmission timing of the acknowledgment response transmission data including the IP header with the synchronization information added.

According to this configuration, when synchronization information has been added to data which is the target of the acknowledgment response, receiving terminal can decide that the transmitting terminal side has intentionally added synchronization information and communication is being normally carried out. Therefore, even in the case where transmission timing of an acknowledgment response is delayed, the receiving terminal can receive data from the transmitting terminal stored in the access point after transmitting the acknowledgment response. Therefore, by repeating such processing, the receiving terminal can periodically secure the period during which the receiving terminal transitions to a power-saving mode, and can thereby reduce power consumption.

A still further aspect of the data wireless receiving apparatus of the present invention further includes a transfer rate decision section that decides a transfer rate based on a reception time difference in the received data between last time and this time, in which the transmission timing adjusting section adjusts transmission timing of the acknowledgment response transmission data including the IP header with the synchronization information added based on the transfer rate.

According to this configuration, when a high transfer rate is maintained, the receiving terminal can be made not to transition to a power-saving mode without interrupting the transfer of the acknowledgment response. This allows the receiving terminal to shorten a time until all transmission data is received in an application such as downloading of a file. Furthermore, even in the case of an application such as streaming reception that requires a high transfer rate, the receiving terminal can prevent interruption of video caused by a shortage of arriving data.

In a still further aspect of the data wireless receiving apparatus of the present invention, the transmission timing adjusting section adjusts the transmission timing of the acknowledgment response transmission data based on a result of comparison in the acknowledgment response number in the TCP header of the acknowledgment response transmission data between this time and last time.

According to this configuration, upon detecting loss of transmission data, the receiving terminal can be made not to transition to the power-saving mode without interrupting communication. This allows the receiving terminal to immediately notify retransmission processing on the lost data to the transmitting terminal, and thereby avoid a useless reduction of the transfer rate.

An aspect of a wireless communication method according to the present invention is a wireless communication method whereby a data transmitting apparatus on a transmitting side and a data wireless receiving apparatus on a receiving side TCP/IP-communicate transmission/received data including an IP header and a TCP header via a wireless base station using a TCP/IP protocol, in which the data transmitting apparatus analyzes, based on a TCP header of first transmission data transmitted from the data transmitting apparatus to the data wireless receiving apparatus, whether or not the first transmission data is an acknowledgment response in TCP communication, determines, when the first transmission data is other than the acknowledgment response, whether or not to add synchronization information necessary to operate with the wireless base station in a power-saving mode to an IP header of the first transmission data based on the TCP header of the first transmission data and transmits the first transmission data including the IP header with the synchronization information added, and the data wireless receiving apparatus adds synchronization information necessary to operate with the wireless base station in a power-saving mode to an IP header of second transmission data indicating an acknowledgment response to the received data received from the data transmitting apparatus among transmission data transmitted from the data wireless receiving apparatus to the data transmitting apparatus, decides whether or not the synchronization information has been added to the IP header of the received data, controls transfer timing of the second transmission data according to a decision result in the received data decision section, and transfers the second transmission data according to the transfer timing.

According to this method, the transmitting terminal side can determine whether or not to add synchronization information to transmission data according to various types of communication states of TCP communication. This allows the transmitting terminal side to cause the access point to temporarily receive data from the transmitting terminal as U-APSD non-compatible data. As a result, the receiving terminal can avoid a situation in which it is difficult to receive data from the buffer of the access point, that is, interruption (deadlock) of a communication data flow.

Furthermore, the receiving terminal adds synchronization information to the acknowledgment response which becomes a trigger frame for reliably extracting transmission data, and can thereby receive all data from the transmitting terminal stored in the access point. Furthermore, even if synchronization information is not added to received data which is a target of the TCP acknowledgment response and transmission data may remain stored in the access point, the receiving terminal immediately transmits an acknowledgment response with synchronization information added. This allows the receiving terminal to reliably receive transmission data that may have been stored but may not have been extracted.

Advantageous Effects of Invention

According to the present invention, it is possible to efficiency make a transition to a power-saving mode without interrupting a data flow even when using U-APSD in TCP communication.

BRIEF DESCRIPTION OF DRAWINGS

FIG. 10 is a diagram illustrating an example of the correspondence between a sequence number of received data and the presence or absence of synchronization information;

DESCRIPTION OF EMBODIMENTS

Hereinafter, embodiments of the present invention will be described in detail with reference to the accompanying drawings.

(Embodiments)

Figure 6:
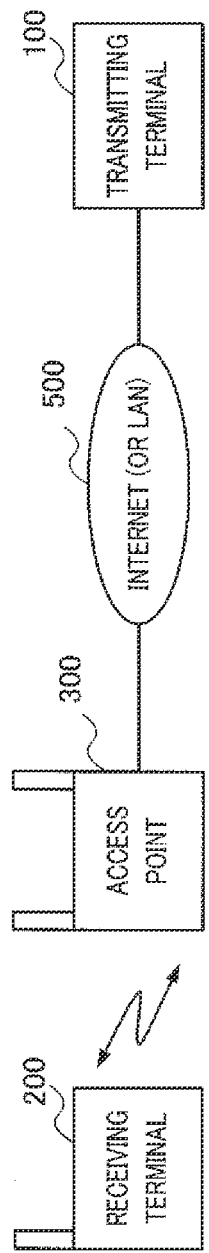
FIG. 6 is a diagram illustrating a wireless communication system according to an embodiment of the present invention.

FIG. 6 is a diagram illustrating an example of configuration of a wireless communication system according to an embodiment of the present invention.

The wireless communication system according to the present embodiment is provided with receiving terminal 200 on the data receiving side, access point 300, Internet 500, and transmitting terminal 100 on the data transmitting side.

Transmitting terminal 100 on the data transmitting side is a communication apparatus connected to Internet (or LAN or the like) 500. The transmitting terminal side may be a wireless terminal wirelessly connected to the Internet via access point 300 or a communication terminal wired to the Internet without going through any access point. Transmitting terminal 100 has the function of accepting a connection from other devices such as a streaming delivery server and transmitting data such as content or application data to the other party. Transmitting terminal 100 may be a portable device or fixed device.

Receiving terminal 200 on the data receiving side is configured as a wireless terminal mounted with a wireless communication device. Receiving terminal 200 is connected to Internet (or LAN or the like) 500 via access point 300. Receiving terminal 200 is connected to transmitting terminal 100 via Internet (or LAN or the like) 500 and receives data from transmitting terminal 100. Receiving terminal 200 is a portable device mounted with a wireless LAN device as a communication interface.

Here, a protocol with flow control such as TCP is used for data transmission/reception between receiving terminal 200 and transmitting terminal 100.

Figure 7:
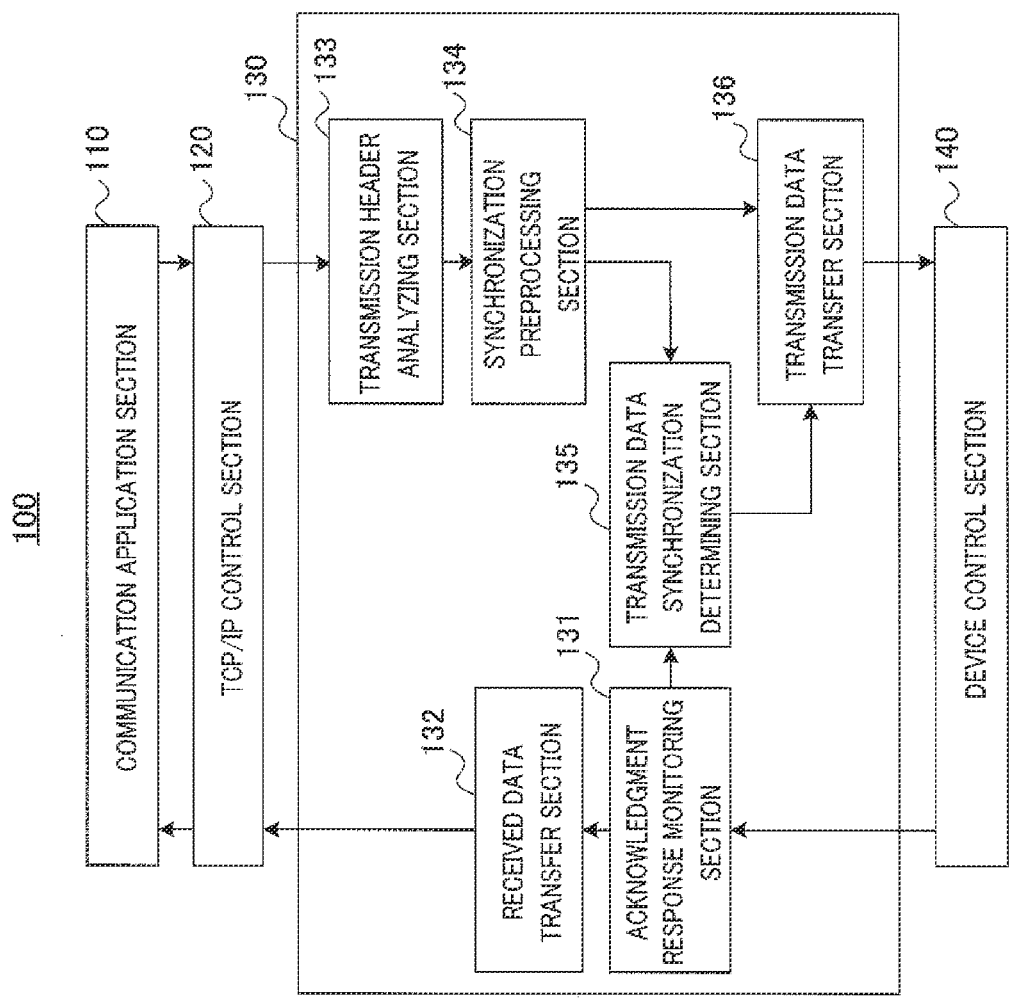
FIG. 7 is a block diagram illustrating principal components of a data transmitting apparatus on a transmitting side according to the present embodiment.

FIG. 7 is a block diagram illustrating an example of configuration of the data transmitting apparatus on the transmitting side according to the present invention. Data transmitting apparatus (hereinafter, simply referred to as "transmitting terminal") 100 is applied to the transmitting terminal in FIG. 6.

To avoid complicated description, FIG. 7 shows components of transmitting terminal 100 involved in the transmission of transmission data and reception of a response signal for the transmission data closely related to the present invention. Therefore, the following description will omit illustration and description of the components involved in the reception of application data transmitted from receiving terminal 200 and the transmission of a response signal for the data.

Transmitting terminal 100 includes communication application section 110, TCP/IP control section 120, power-saving mode control section 130 and device control section 140. Power-saving mode control section 130 includes acknowledgment response monitoring section 131, received data transfer section 132, transmission header analyzing section 133, synchronization preprocessing section 134, transmission data synchronization determining section 135 and transmission data transfer section 136.

Though not shown, transmitting terminal 100 may also be provided with a user interface for the user of transmitting terminal 100 to select and execute operation of transmitting terminal 100. For example, transmitting terminal 100 may also be provided with functions such as input key, display, microphone, speaker, camera, vibrator, memory for storage or execution of a program as a user interface.

Communication application section 110 executes a communication application program.

Figure 1:
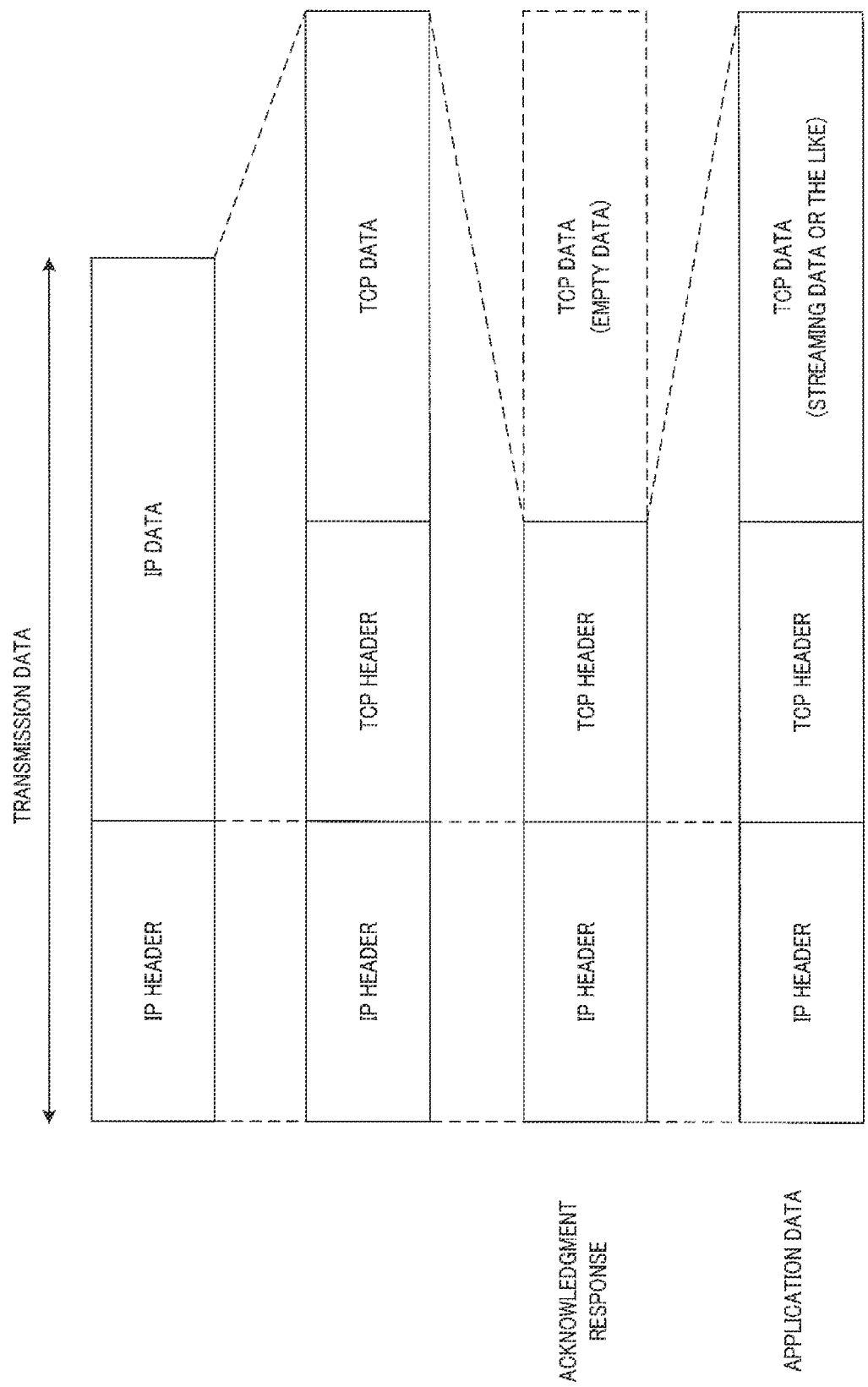
FIG. 1 is a diagram illustrating a data format used in a network layer.
Figure 2:
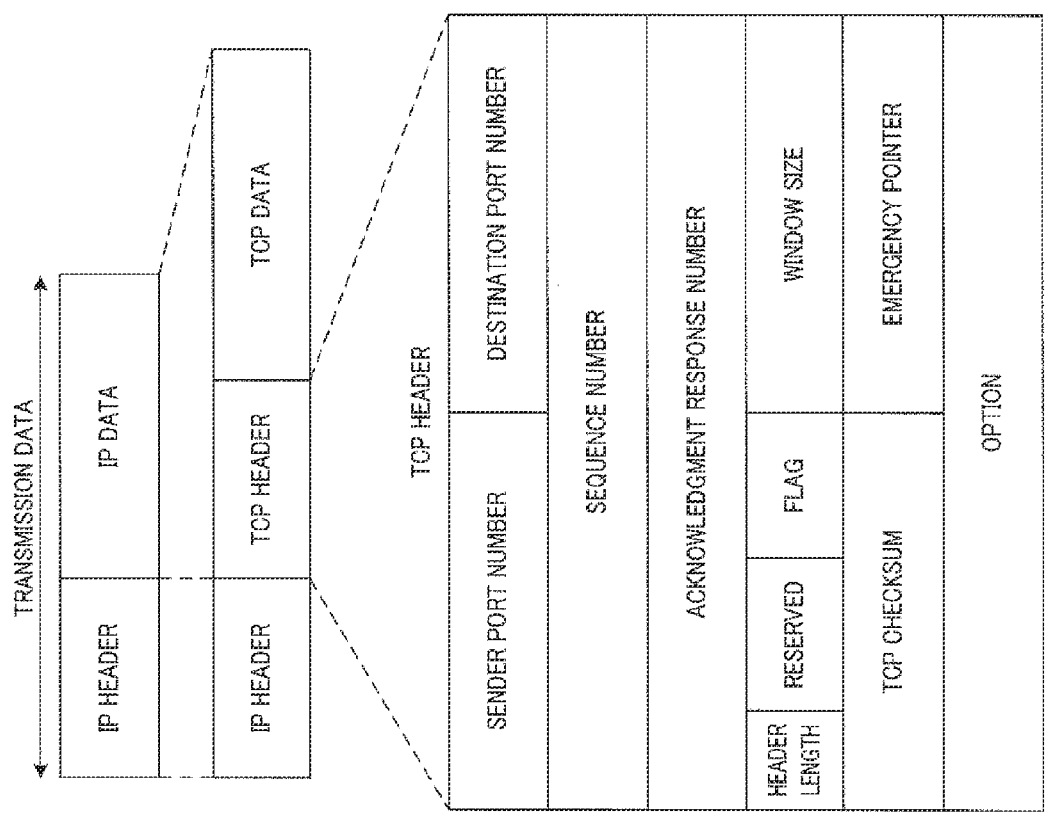
FIG. 2 is a diagram illustrating details of a TCP header.
Figure 3:
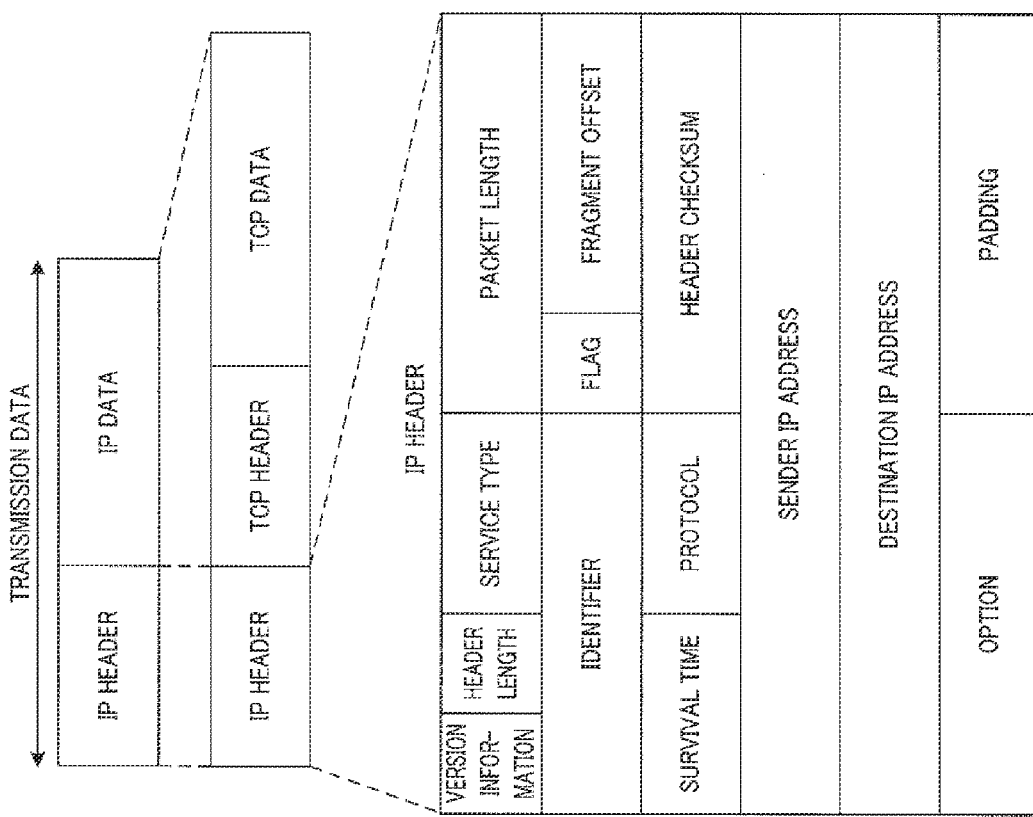
FIG. 3 is a diagram illustrating details of an IP header.
Figure 4:
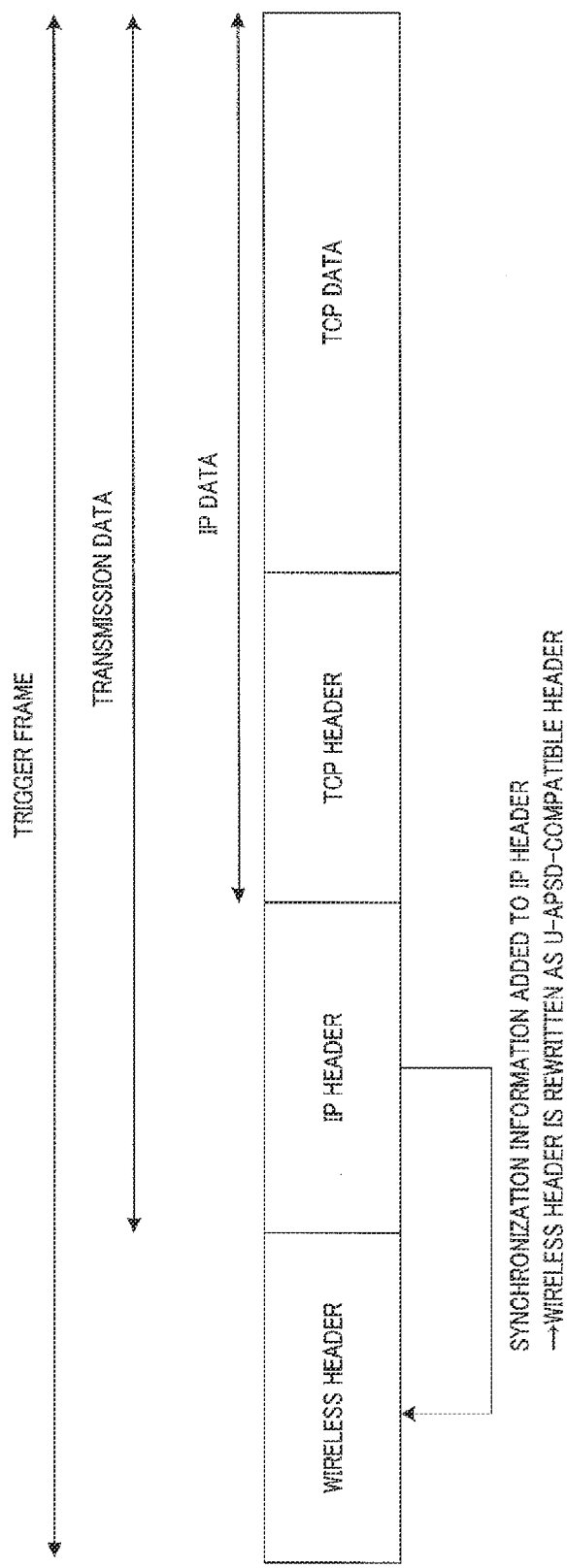
FIG. 4 is a diagram illustrating a data format used in a data link layer.
Figure 5:
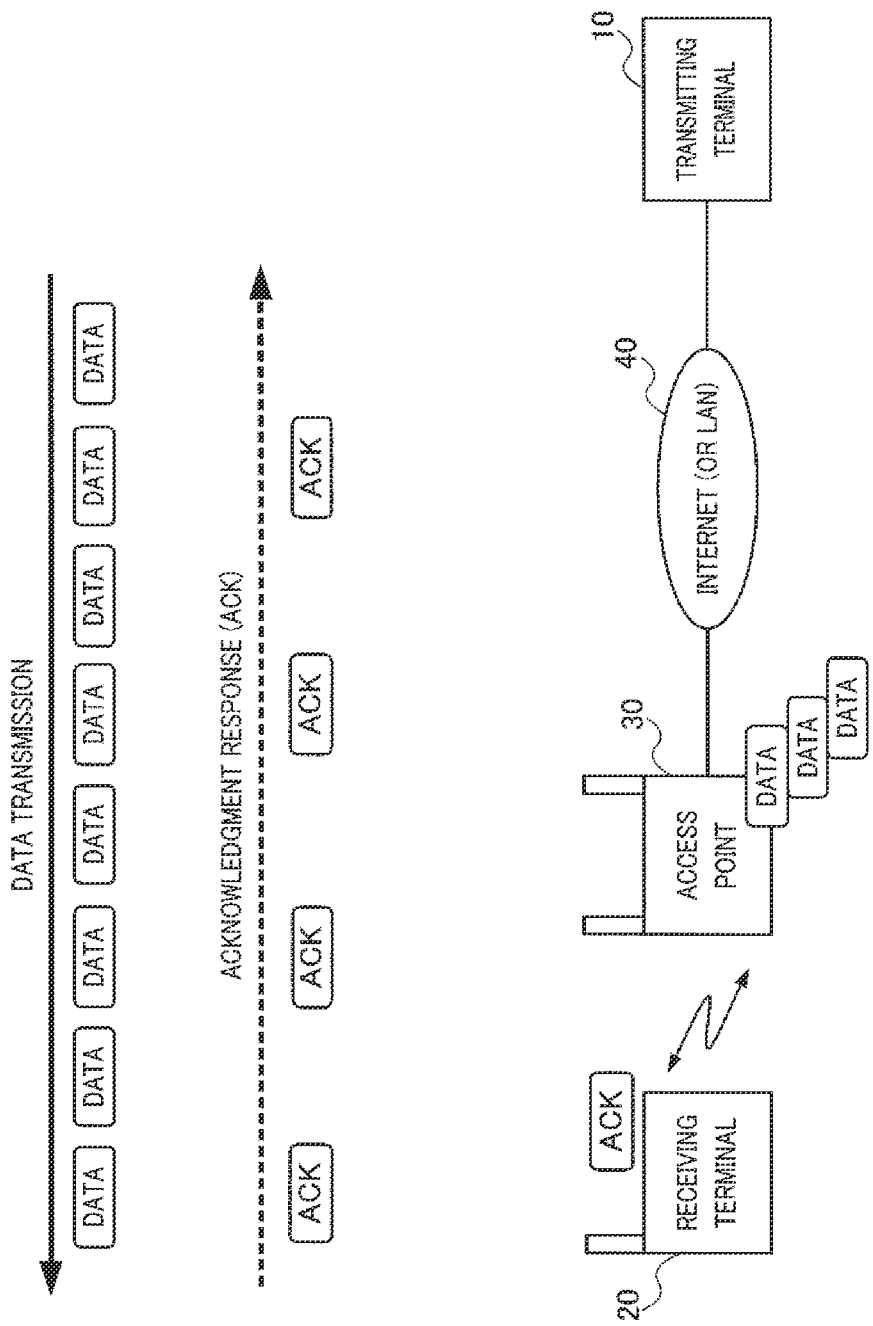
FIG. 5 is a diagram illustrating problems of a conventional wireless communication apparatus.

TCP/IP control section 120 executes protocol processing on transmission/received data using TCP/IP. TCP/IP control section 120 then outputs transmission data after protocol processing to transmission header analyzing section 133. Furthermore, TCP/IP control section 120 outputs received data after protocol processing (that is, TCP data) to communication application section 110. The data format of transmission data outputted from TCP/IP control section 120 to transmission header analyzing section 133 is similar to that in FIG. 1.

Device control section 140 transfers transmission/received data between transmitting terminal 100 and a LAN device (or wireless LAN device) (not shown).

Power-saving mode control section 130 determines whether or not to add synchronization information necessary to operate with access point 300 in a power-saving mode to the IP header of the transmission data based on the TCP header. The data format of the transmission/received data handled by power-saving mode control section 130 is similar to that in FIG. 1.

Acknowledgment response monitoring section 131 monitors the reception interval of an acknowledgment response in TCP communication and contents of the acknowledgment response. Here, the acknowledgment response is a response signal from receiving terminal 200 for the transmission data transmitted from transmitting terminal 100. When notifying the acknowledgment response to transmitting terminal 100, receiving terminal 200 that performs TCP communication stores the sequence number in the TCP header of the transmission data transmitted from transmitting terminal 100 in the acknowledgment response number in the TCP header of the acknowledgment response. Receiving terminal 200 then transmits transmission data including the TCP header and indicating an acknowledgment response to transmitting terminal 100.

Acknowledgment response monitoring section 131 monitors the reception interval of acknowledgment responses as to whether acknowledgment responses in TCP communication are periodically received or not. Furthermore, acknowledgment response monitoring section 131 monitors information on the window size of the receiving side advertised by each acknowledgment response. As described above, the window size is a buffer size on the receiving side that can save data transmitted from the transmitting side at a time. The window size successively changes depending on the processing state of receiving terminal 200 during communication. For this reason, in TCP communication, the size is notified to the transmitting side every time at the acknowledgment response transmission. Acknowledgment response monitoring section 131 monitors the reception interval of acknowledgment responses and the TCP headers of the acknowledgment responses and notifies the monitoring result to transmission data synchronization determining section 135. Upon receiving the notification of the monitoring result, transmission data synchronization determining section 135 finally determines whether or not to add synchronization information to the IP header of the transmission data.

Received data transfer section 132 transfers the acknowledgment responses received from acknowledgment response monitoring section 131 to TCP/IP control section 120 just as they are.

Transmission header analyzing section 133 analyzes the TCP header of the transmission data. To be more specific, transmission header analyzing section 133 analyzes whether or not the transmission data is an acknowledgment response in TCP communication by monitoring the data size of the TCP data. When the transmission data is an acknowledgment response in TCP communication, the data size of the TCP data is 0 and the SYN/FIN flag is not set. On the other hand, when the transmission data is not any acknowledgment response in TCP communication, transmission header analyzing section 133 analyzes whether transmission data is transmission data (SYN/FIN data) indicating a specific state of TCP communication. To be more specific, transmission header analyzing section 133 analyzes the TCP header by monitoring the SYN/FIN flag included in the "flag" field of the TCP header. As described above, the SYN data indicates a request for starting TCP communication and the FIN data indicates a request for ending TCP communication. After the analysis of the TCP header, transmission header analyzing section 133 transfers transmission data as well as the analysis result to synchronization preprocessing section 134.

Synchronization preprocessing section 134 makes an advance decision as to whether or not to add synchronization information necessary to operate with access point 300 in a power-saving mode using U-APSD to the IP header of the transmission data based on the analysis result of the TCP header.

To be more specific, synchronization preprocessing section 134 decides based on the analysis result of the TCP header whether the transmission data is data in a specific state of TCP communication (hereinafter, referred to as "specific data") or retransmission data retransmitted due to packet loss. When the transmission data is specific data or retransmission data, synchronization preprocessing section 134 decides not to add synchronization information.

In the case where synchronization preprocessing section 134 makes an advance decision not to add synchronization information, it transfers the transmission data to transmission data transfer section 136 just as it is.

On the other hand, when the transmission data is neither specific data of TCP communication nor retransmission data, synchronization preprocessing section 134 makes an advance decision as to whether or not synchronization information is likely to be added. When synchronization preprocessing section 134 makes an advance decision that synchronization information is likely to be added, it transfers transmission data to transmission data synchronization determining section 135.

Transmission data synchronization determining section 135 finally determines whether or not to add synchronization information to the transmission data transferred from synchronization preprocessing section 134 according to the reception interval of acknowledgment responses notified from receiving terminal 200 and contents (TCP header) of the acknowledgment responses. Here, the transmission data transferred from synchronization preprocessing section 134 to transmission data synchronization determining section 135 is mainly data other than specific data of TCP communication (normal application data or the like). The method of finally determining whether or not to add synchronization information in transmission data synchronization determining section 135 will be described later.

Figure 8:
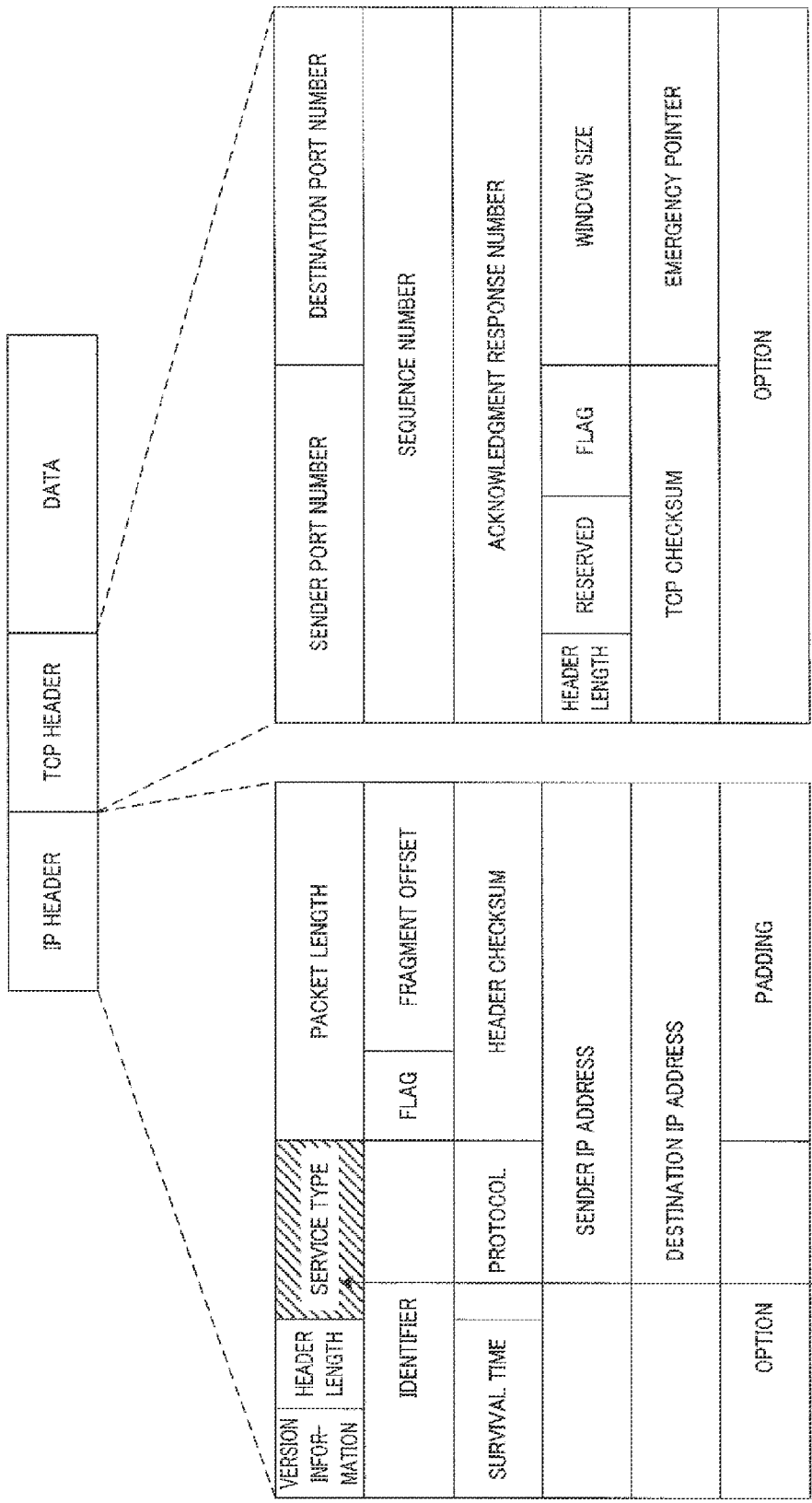
FIG. 8 is a diagram illustrating transmission data regenerated with synchronization information added to an IP header of transmission data.

Upon finally determining to add synchronization information, transmission data synchronization determining section 135 adds synchronization information to the IP header of the transmission data to regenerate transmission data and outputs the regenerated transmission data to transmission data transfer section 136. As shown in FIG. 8, the synchronization information is added to the "service type" field of the IP header. Upon finally determining not to add the synchronization information, transmission data synchronization determining section 135 transfers the transmission data to transmission data transfer section 136 just as it is.

Transmission data transfer section 136 transfers the transmission data whose processing has ended to a wireless LAN device via device control section 140.

Figure 9:
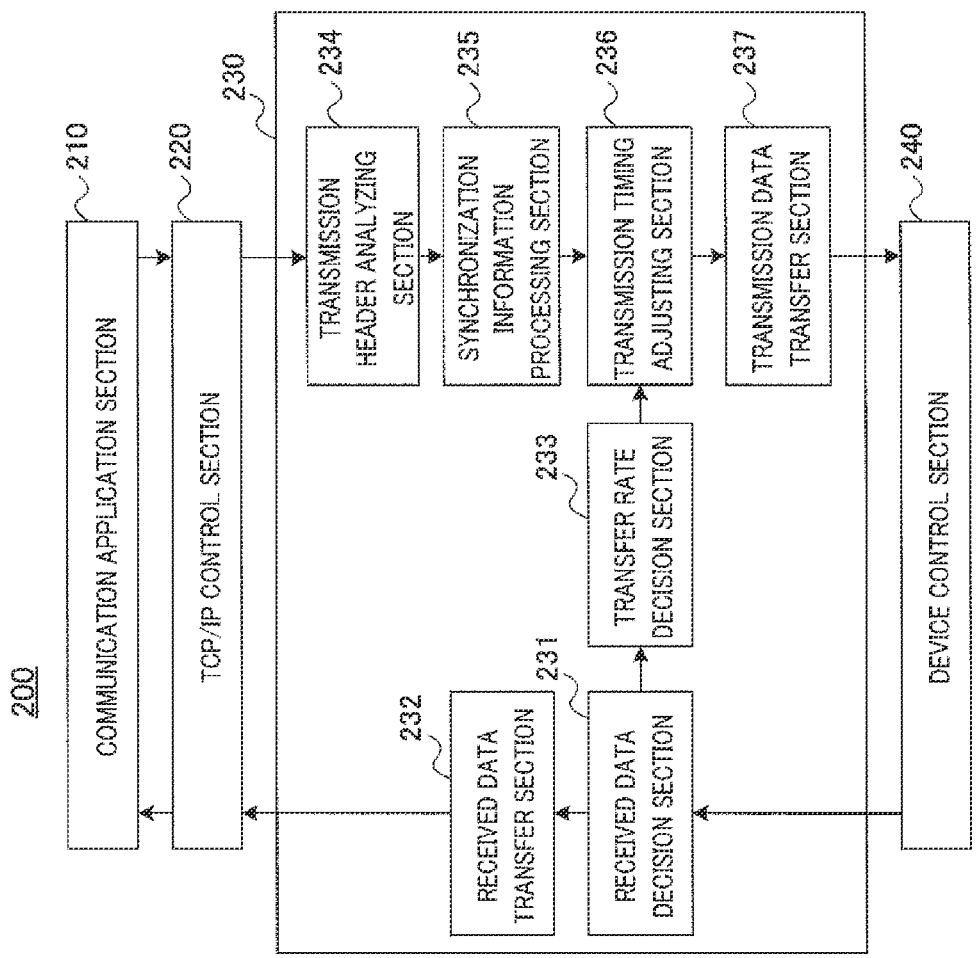
FIG. 9 is a block diagram illustrating principal components of a data wireless receiving apparatus on a receiving side according to the present embodiment.

FIG. 9 is a block diagram illustrating an example of configuration of the data wireless receiving apparatus on the receiving side of the present invention. Data wireless receiving apparatus (hereinafter, simply referred to as "receiving terminal") 200 is applied to the receiving terminal in FIG. 6.

To avoid complicated description, receiving terminal 200 shown in FIG. 9 illustrates components involved in the reception of received data and the transmission of a response signal for the received data closely related to the present invention. For this reason, the following description will omit illustration and description of the components involved in the transmission of application data to transmitting terminal 100 and the reception of a response signal for the data.

Receiving terminal 200 includes communication application section 210, TCP/IP control section 220, power-saving mode control section 230 and device control section 240. Here, power-saving mode control section 230 includes received data decision section 231, received data transfer section 232, transfer rate decision section 233, transmission header analyzing section 234, synchronization information processing section 235, transmission timing adjusting section 236 and transmission data transfer section 237.

Though not shown, receiving terminal 200 may also be provided with a user interface for the user to select and execute operation of receiving terminal 200. For example, receiving terminal 200 may also be provided with functions such as input key, display, microphone, speaker, camera, vibrator, memory for storage or execution of a program as an interface.

Communication application section 210 executes a communication application program.

TCP/IP control section 220 executes protocol processing on transmission/received data using TCP/IP. TCP/IP control section 220 then outputs the transmission data after the protocol processing to transmission header analyzing section 234. When notifying an acknowledgment response for the received data to transmitting terminal 100, TCP/IP control section 220 stores a sequence number in the TCP header of the received data in an acknowledgment response number in the TCP header of the transmission data. TCP/IP control section 220 outputs transmission data including the TCP header and indicating an acknowledgment response to transmission header analyzing section 234. The data format of the transmission data outputted from TCP/IP control section 220 to transmission header analyzing section 234 is similar to that in FIG. 1. Furthermore, TCP/IP control section 220 outputs the received data received from transmitting terminal 100 and subjected to protocol processing (that is, TCP data) to communication application section 210.

Device control section 240 transfers the transmission/received data between the receiving terminal 200 and a wireless LAN device (not shown).

Power-saving mode control section 230 adjusts transfer timing of the acknowledgment response depending on whether or not synchronization information has been added to the IP header of the data received from transmitting terminal 100 as follows. This allows receiving terminal 200 to efficiently transition to a power-saving mode without interrupting the data flow even when using U-APSD in TCP communication. The data format of the transmission/received data handled by power-saving mode control section 230 is similar to that in FIG. 1.

Received data decision section 231 outputs the data received from access point 300 (transmission data transmitted from transmitting terminal 100) to received data transfer section 232. Furthermore, received data decision section 231 decides whether or not synchronization information has been added to the IP header of the data received from access point 300 (transmission data transmitted from transmitting terminal 100). Received data decision section 231 notifies the decision result to transfer rate decision section 233.

Received data transfer section 232 transfers the received data received from transmitting terminal 100 to TCP/IP control section 220 just as it is.

Transfer rate decision section 233 decides the transfer rate in current communication based on a difference in reception time between the received data this time and the received data last time. Furthermore, transfer rate decision section 233 manages the presence or absence of synchronization information using the sequence number. For example, transfer rate decision section 233 manages whether or not the IP header of the received data contains synchronization information in association with the sequence number of the received data as shown in FIG. 10. Transfer rate decision section 233 manages the correspondence between the sequence number of the received data and the presence or absence of the synchronization information until TCP/IP control section 220 generates an acknowledgment response for the received data and transfers the acknowledgment response to synchronization information processing section 235. Transfer rate decision section 233 then periodically notifies information on the presence or absence of the synchronization information managed using the transfer rate and sequence number (hereinafter, referred to as "reception situation information") to transmission timing adjusting section 236.

Transmission header analyzing section 234 analyzes the TCP header of the transmission data. To be more specific, transmission header analyzing section 234 analyzes whether or not the transmission data is an acknowledgment response in TCP communication by monitoring the data size of the TCP data. After the analysis of the TCP header, transmission header analyzing section 234 transfers the transmission data together with the analysis result to synchronization information processing section 235.

Figure 11:
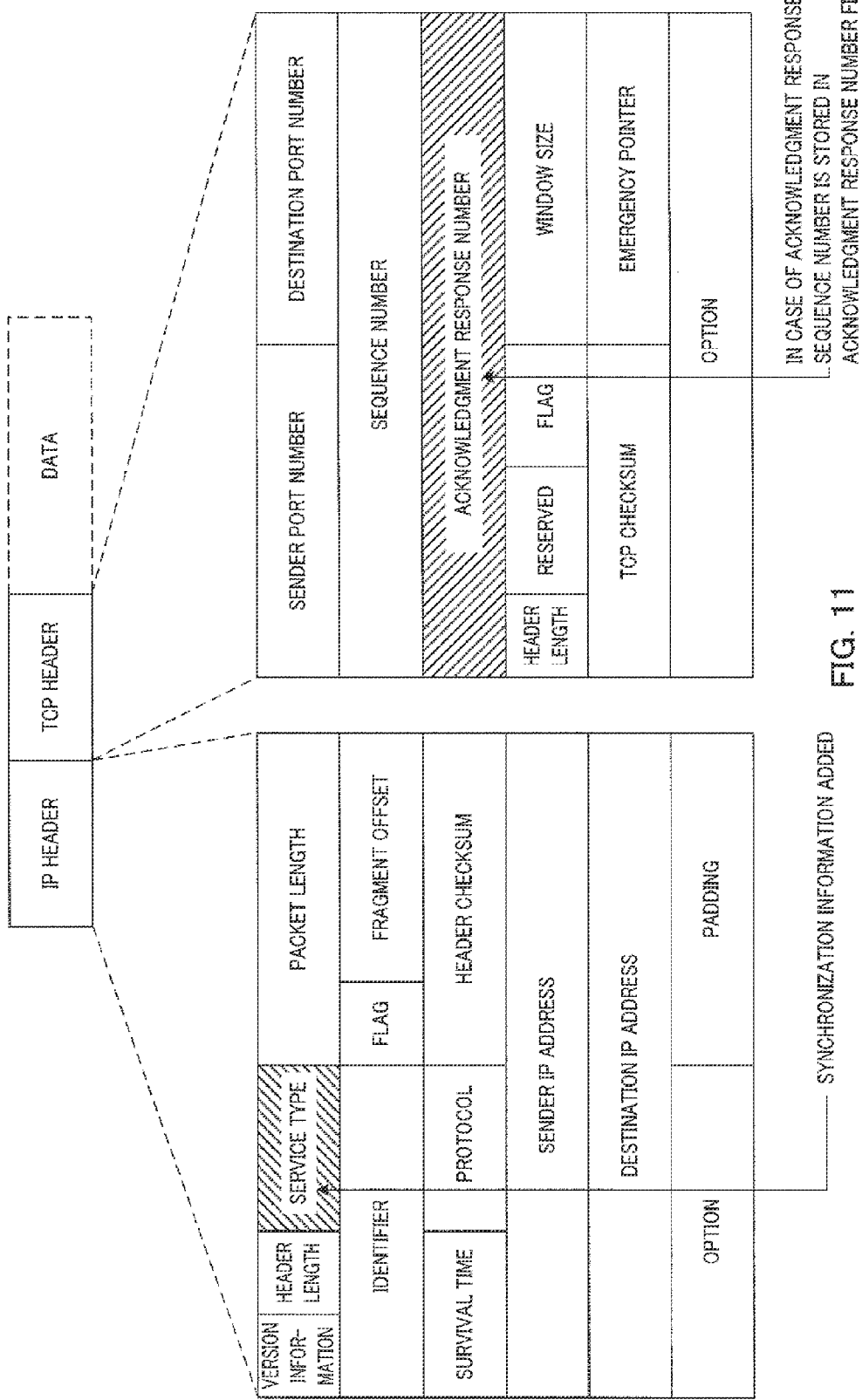
FIG. 11 is a diagram illustrating transmission data regenerated with synchronization information added to an IP header of transmission data indicating an acknowledgment response.

Synchronization information processing section 235 adds the synchronization information necessary to operate with access point 300 in a power-saving mode using U-APSD to the IP header of the acknowledgment response. Thus, synchronization information is added to all the IP headers of transmission data indicating acknowledgment responses. FIG. 11 is a diagram illustrating transmission data in this case. As shown in FIG. 11, synchronization information is added to the "service type" field of the IP header. Synchronization information processing section 235 outputs transmission data indicating the acknowledgment response with synchronization information added to the IP header to transmission timing adjusting section 236.

When the transmission data is an acknowledgment response, transmission timing adjusting section 236 decides whether or not synchronization information has been added to the IP header of the transmission data assigned the sequence number that matches the acknowledgment response number in the TCP header of the transmission data. When, for example, the acknowledgment response number is "2" and the result of correspondence shown in FIG. 10 is notified, transmission timing adjusting section 236 decides that synchronization information has not been added to the IP header of the transmission data assigned sequence number "2." Thus, transmission timing adjusting section 236 decides whether or not synchronization information has been added to the IP header of the received data corresponding to the sequence number which becomes an acknowledgment response target.

When synchronization information has not been added to the IP header of the received data which becomes the acknowledgment response target, transmission timing adjusting section 236 immediately transfers the acknowledgment response to transmission data transfer section 237. When synchronization information has not been added to the IP header of the received data which becomes the acknowledgment response target, the transmission data from transmitting terminal 100 remains stored in access point 300 and may not have been extracted. Therefore, transmission timing adjusting section 236 immediately transfers the acknowledgment response to transmission data transfer section 237 and thereby immediately transmits the acknowledgment response with synchronization information added to the IP header. This allows receiving terminal 200 to reliably receive transmission data which may have been stored in access point 300 but may not have been extracted.

On the other hand, when synchronization information has been added to the IP header of the received data which becomes the acknowledgment response target, transmission timing adjusting section 236 delays transmission timing of acknowledgment responses. When the synchronization information has been added to the received data which becomes the acknowledgment response target, it is assumed that transmitting terminal 100 has intentionally added synchronization information and communication is being normally performed. Therefore, even when receiving terminal 200 stops communication and delays the transmission timing of acknowledgment responses, receiving terminal 200 can enter the power-saving mode for a certain time while avoiding data delays.

Thus, transmission timing adjusting section 236 determines to what extent a transition is made to the power-saving mode based on the information on the transfer rate notified from transfer rate decision section 233. To be more specific, transmission timing adjusting section 236 determines a standby time until an acknowledgment response is transferred to transmission data transfer section 237 based on the transfer rate or acknowledgment response number. Until the standby time elapses, receiving terminal 200 transitions to the power-saving mode. After the completion of the standby time, transmission timing adjusting section 236 outputs an acknowledgment response to transmission data transfer section 237.

To be more specific, transmission timing adjusting section 236 decides whether the transmission data transmitted from transmitting terminal 100 maintains a high transfer rate or not based on the information on the transfer rate. Furthermore, transmission timing adjusting section 236 decides whether or not receiving terminal 200 urges transmitting terminal 100 to perform retransmission processing based on the acknowledgment response number. When the acknowledgment response number is equal to the acknowledgment response number processed last time, transmission timing adjusting section 236 can decide that receiving terminal 200 is urging retransmission processing.

When the transfer rate is high or receiving terminal 200 is urging retransmission processing, transmission timing adjusting section 236 determines the standby time to be 0. Transmission timing adjusting section 236 then immediately outputs an acknowledgment response with synchronization information added to the IP header in synchronization information processing section 235 to transmission data transfer section 237.

On the other hand, when the transfer rate is not high and receiving terminal 200 is not urging transmitting terminal 100 to perform retransmission processing, transmission timing adjusting section 236 determines the standby time assuming that a transition is made to the power-saving mode. Receiving terminal 200 then transitions to the power-saving mode until the standby time elapses. Upon expiration of the standby time, transmission timing adjusting section 236 outputs an acknowledgment response with the synchronization information added to the IP header in synchronization information processing section 235 to transmission data transfer section 237.

In this way, transmission timing adjusting section 236 determines the standby time until an acknowledgment response is transferred based on the transfer rate and whether or not retransmission processing is performed. In other words, transmission timing adjusting section 236 adjusts the transmission timing of an acknowledgment response based on the transfer rate. Furthermore, transmission timing adjusting section 236 adjusts the transmission timing of an acknowledgment response based on the result of comparison between the acknowledgment response number this time and the acknowledgment response number last time. Thus, receiving terminal 200 operates in the power-saving mode until the determined standby time elapses.

Transmission data transfer section 237 transfers an acknowledgment response whose processing has been completed to the wireless LAN device via device control section 240.

Operations of transmitting terminal 100 and receiving terminal 200 in the wireless communication system configured as shown above will be described.

Figure 12:
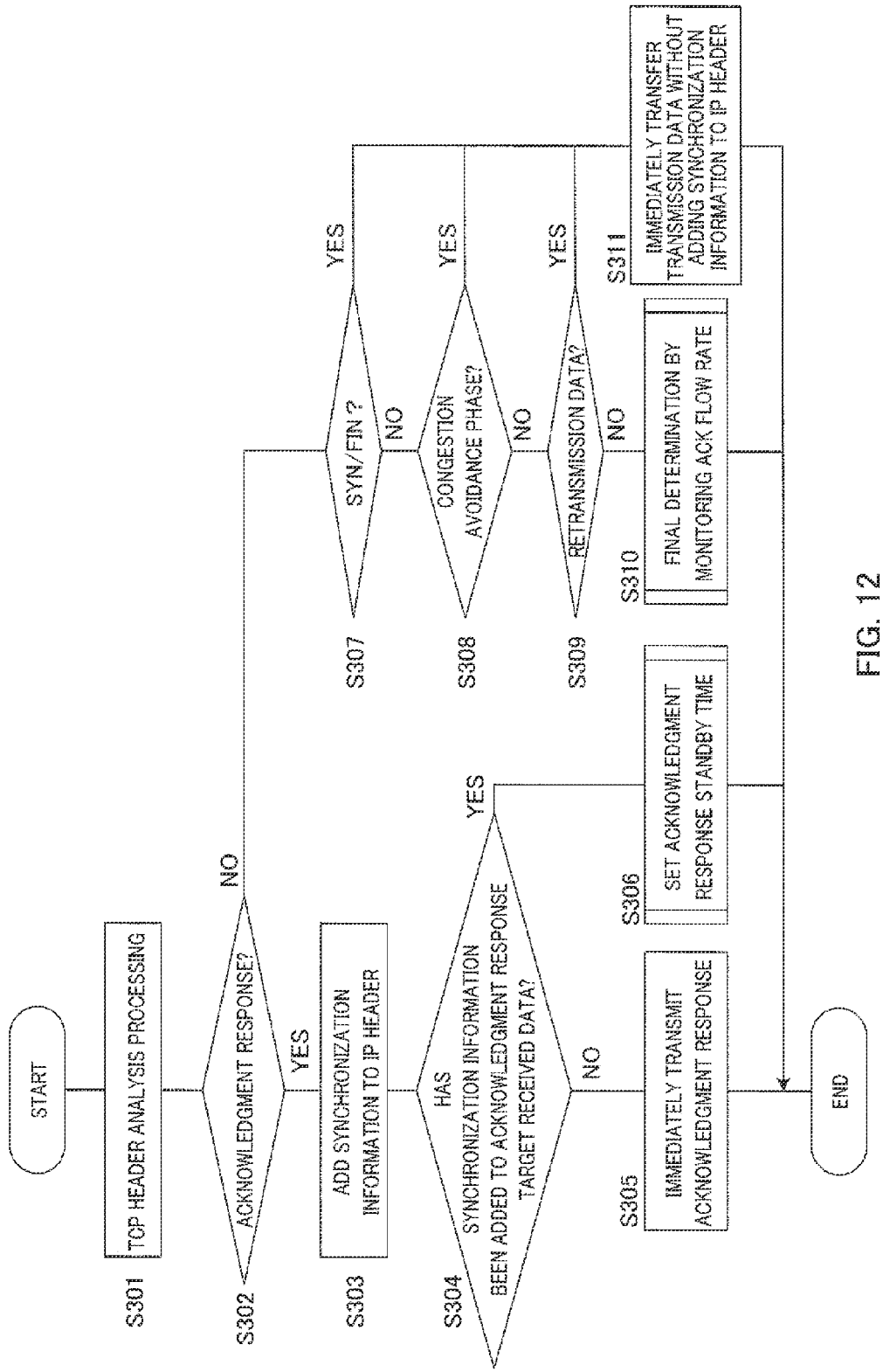
FIG. 12 is a diagram illustrating a data transmission processing flow in the wireless communication system according to the present embodiment.

FIG. 12 is a diagram illustrating a data transmission processing flow in the wireless communication system according to the present embodiment. In TCP communication, data transmission processing requested by receiving terminal 200 corresponds to this flow in transmitting terminal 100 and transmission processing of an acknowledgment response for the data received from transmitting terminal 100 corresponds to this flow in receiving terminal 200.

First, operation of transmitting terminal 100 will be described in detail using FIG. 12. In transmitting terminal 100, upon receiving transmission data from TCP/IP control section 120, transmission header analyzing section 133 performs analysis processing on the TCP header (S301). The analysis result is outputted to synchronization preprocessing section 134.

Synchronization preprocessing section 134 decides whether or not the transmission data is an acknowledgment response based on the analysis result (S302). On the other hand, the transmission data other than the acknowledgment response is streaming data, for example.

When the transmission data is an acknowledgment response (S302: YES), the process proceeds to step S303 and power-saving mode control is performed according to a reception processing flow of receiving terminal 200 which will be described later. The power-saving mode control in receiving terminal 200 will be described later.

On the other hand, when the transmission data is data other than an acknowledgment response (S302: NO), synchronization preprocessing section 134 checks whether the transmission data is SYN data/FIN data indicating the start/end of TCP communication (S307). When the transmission data is SYN data/FIN data indicating the start/end of TCP communication (S307: YES), synchronization preprocessing section 134 immediately transfers transmission data to transmission data transfer section 136 without adding synchronization information to the IP header (S311). That is, in this case, the transmission data is transferred from transmitting terminal 100 to access point 300 without using U-APSD.

On the other hand, when the transmission data is not SYN data/FIN data indicating the start/end of TCP communication (S307: NO), synchronization preprocessing section 134 decides whether or not the TCP communication state in current communication is a congestion avoidance phase (S308). Synchronization preprocessing section 134 can decide whether or not the TCP communication state in current communication is a congestion avoidance phase by acquiring the congestion window size stored in TCP/IP control section 120.

Here, the congestion window size represents a data size that can be transmitted once at a point in time at which TCP/IP control section 120 individually manages the data. When the congestion window size is an extremely small value (e.g., half the maximum value or the like), synchronization preprocessing section 134 decides that the TCP communication state is a congestion avoidance phase.

In the case of a congestion avoidance phase (S308: YES), synchronization preprocessing section 134 immediately transfers the transmission data to transmission data transfer section 136 without adding synchronization information to the IP header (S311). That is, in the case of a congestion avoidance phase, transmission data is transferred from transmitting terminal 100 to access point 300 without using U-APSD.

On the other hand, when the TCP communication state is not a congestion avoidance phase (S308: NO), synchronization preprocessing section 134 decides whether or not the transmission data is retransmission data requested due to packet loss (S309). When, for example, the sequence number of the transmission data is lower than the sequence number of the data transmitted last time, synchronization preprocessing section 134 can decide that the transmission data is retransmission data.

In the case of retransmission data (S309: YES), synchronization preprocessing section 134 immediately transfers the transmission data to transmission data transfer section 136 without adding synchronization information to the IP header (S311). That is, when the transmission data is retransmission data, the transmission data is transferred from transmitting terminal 100 to access point 300 without using U-APSD.

On the other hand, when the transmission data is data other than an acknowledgment response (S302: NO), not a congestion avoidance phase (S308: NO), nor retransmission data (S309: NO), TCP communication can be assumed to be a normal state. Thus, synchronization preprocessing section 134 decides that receiving terminal 200 may be able to operate with access point 300 in a power-saving mode using U-APSD. In this case, synchronization preprocessing section 134 transfers the transmission data to transmission data synchronization determining section 135 and transfers a final decision as to whether or not to add synchronization information necessary to operate in a power-saving mode using U-APSD to transmission data synchronization determining section 135.

Transmission data synchronization determining section 135 finally determines whether or not to add synchronization information by monitoring an ACK flow rate (S310). Here, the ACK flow rate is equivalent to the reception interval of acknowledgment responses for transmission data in TCP communication.

Figure 13:
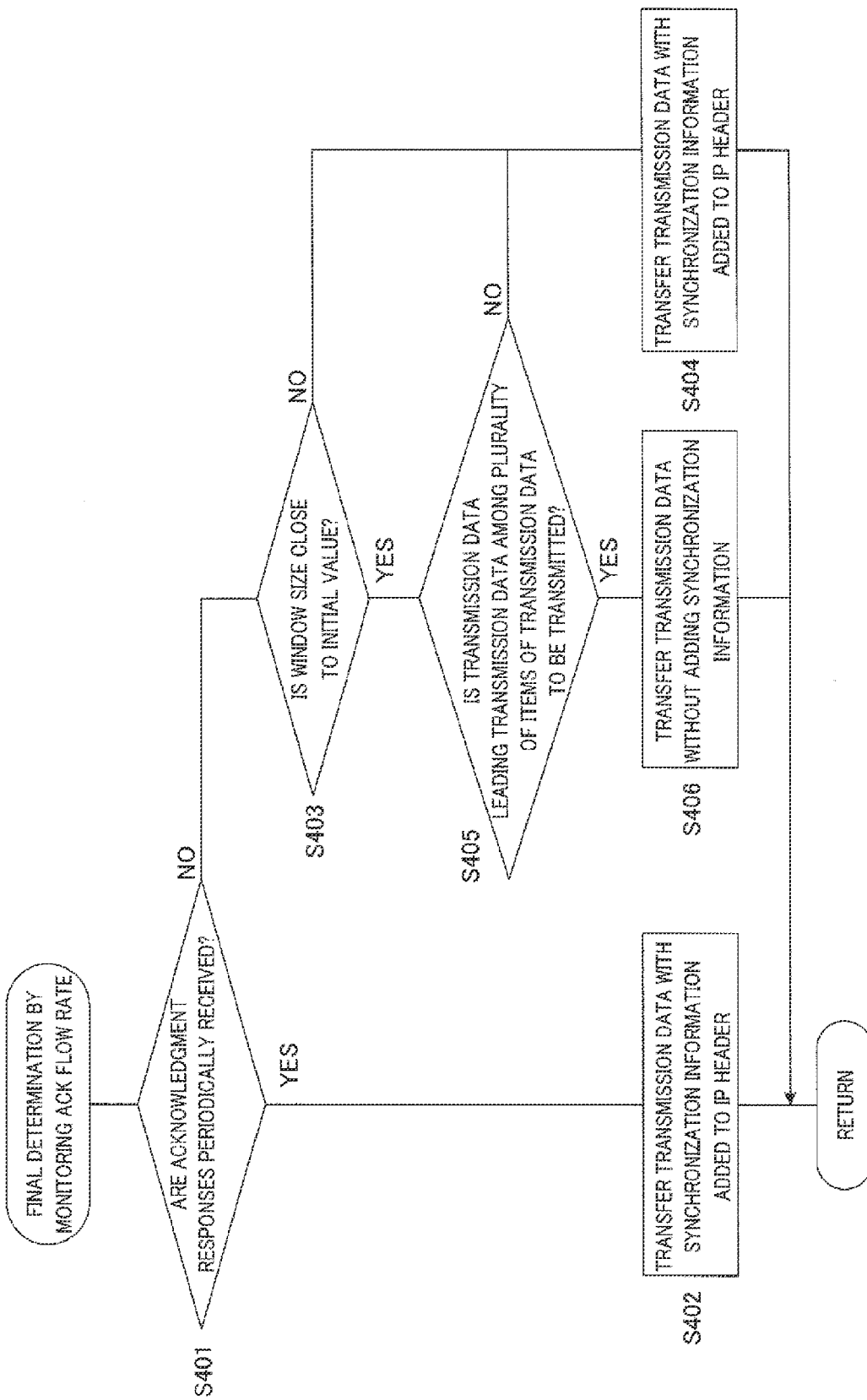
FIG. 13 is a diagram illustrating a processing flow of the transmission data synchronization determining section.

Next, the method of finally determining whether or not to add synchronization information in transmission data synchronization determining section 135 will be described in detail using FIG. 13. FIG. 13 is a diagram illustrating a processing flow of transmission data synchronization determining section 135.

Transmission data synchronization determining section 135 decides whether acknowledgment responses in TCP communication are periodically received or not (whether or not reception interval of acknowledgment responses is constant) (S401). When acknowledgment responses are periodically received, it is assumed that transmission/reception is periodically performed between transmitting terminal 100 and receiving terminal 200. Therefore, when acknowledgment responses are periodically received, it is unlikely that data addressed to receiving terminal 200 may remain stored in access point 300 even when receiving terminal 200 operates in a power-saving mode using U-APSD.

Thus, when acknowledgment responses are periodically received (S401: YES), transmission data synchronization determining section 135 adds synchronization information to the IP header to regenerate transmission data. Transmission data synchronization determining section 135 then transfers the regenerated transmission data to transmission data transfer section 136 (S402). This causes receiving terminal 200 to operate with access point 300 in a power-saving mode using U-APSD. In this case, since receiving terminal 200 periodically transmits acknowledgment responses, receiving terminal 200 can receive transmission data stored in access point 300 without delays even when using U-APSD.

On the other hand, when acknowledgment responses are not periodically received (S401: NO), the process proceeds to step S403. Transmission data synchronization determining section 135 decides whether or not the window size notified at the acknowledgment response transmission is close to an initial value notified at the start of communication (S403). In a state in which the window size notified at the acknowledgment response transmission is not close to an initial value notified at the start of communication, it is assumed that data is reliably transmitted from receiving terminal 200.

Thus, when the window size is not close to an initial value (S403: NO), transmission data synchronization determining section 135 decides that U-APSD will be used. Transmission data synchronization determining section 135 then adds synchronization information to the IP header of the transmission data, regenerates transmission data and transfers the regenerated transmission data to transmission data transfer section 136 (S404). This causes receiving terminal 200 to operate with access point 300 in the power-saving mode using U-APSD. In this case, receiving terminal 200 performs reception processing on the received data, and receiving terminal 200 notifies transmitting terminal 100 of an acknowledgment response for the received data. For this reason, also when using U-APSD, receiving terminal 200 can receive transmission data stored in access point 300 without delay using the acknowledgment response as a trigger.

On the other hand, when the window size is close to an initial value (S403: YES), receiving terminal 200 assumes that there is substantially no data to be processed and data may be stored in access point 300 accordingly. Next, transmission data synchronization determining section 135 decides on a plurality of items of transmission data to be transmitted using the reception of an acknowledgment response as a trigger whether or not the transmission data is leading transmission data (S405).

When the transmission data is the leading transmission data (S405: YES), transmission data synchronization determining section 135 does not add synchronization information to the IP header of the leading transmission data and transfers the transmission data to transmission data transfer section 136 just as it is (S406). This causes receiving terminal 200 to operate in a normal mode. Therefore, the present invention avoids such a situation in which the transmission data from transmitting terminal 100 may remain stored in access point 300 even when there is no transmission data from receiving terminal 200.

On the other hand, when the transmission data is not the leading transmission data but subsequent transmission data (S405: NO), transmission data synchronization determining section 135 decides that U-APSD will be used. Transmission data synchronization determining section 135 then adds synchronization information to the IP header of the transmission data, regenerates transmission data and transfers the regenerated transmission data to transmission data transfer section 136 (S404). This causes receiving terminal 200 to operate with access point 300 in a power-saving mode using U-APSD. In this case, receiving terminal 200 performs reception processing on the leading transmission data, and receiving terminal 200 notifies transmitting terminal 100 of an acknowledgment response for the leading transmission data via access point 300. For this reason, even when using U-APSD, receiving terminal 200 can receive subsequent transmission data stored in access point 300 without delay using the acknowledgment response as a trigger.

Through such a series of processes on the transmitting terminal 100 side, the transmitting terminal 100 side appropriately adds synchronization information necessary for U-APSD or adds no synchronization information in a certain specific state. This allows the receiving terminal 200 side to avoid such a state in which it is difficult to acquire U-APSD-compatible data arriving at access point 300. Furthermore, when stable communication is being carried out, transmitting terminal 100 can support communication control to appropriately make a transition to the power-saving mode.

Next, operation of receiving terminal 200 on the receiving side of transmission processing on an acknowledgment response for the data received from transmitting terminal 100 will be described in detail using FIG. 12.

In receiving terminal 200, upon receiving transmission data from TCP/IP control section 220, transmission header analyzing section 234 performs analysis processing on the TCP header (S301). The analysis result is outputted to synchronization information processing section 235.

Synchronization information processing section 235 decides whether or not the transmission data is an acknowledgment response based on the analysis result (S302). The acknowledgment response is a response signal for the data transmitted from transmitting terminal 100 to receiving terminal 200. On the other hand, transmission data other than the acknowledgment response is, for example, streaming data.

When the transmission data is not an acknowledgment response (S302: NO), synchronization information processing section 235 controls whether or not the transmitting terminal 100 side uses U-APSD according to transmission processing flow S307 to S311.

On the other hand, when the transmission data is an acknowledgment response (S302: YES), synchronization information processing section 235 adds synchronization information to the IP header of the acknowledgment response (S303).

Synchronization information processing section 235 then decides whether or not synchronization information has been added to the IP header of the received data which becomes the acknowledgment response target (S304). To be more specific, synchronization information processing section 235 decides whether or not synchronization information has been added to the IP header of the received data which becomes the acknowledgment response target based on the correspondence between the sequence number and the presence or absence of synchronization information.

Here, when synchronization information has not been added (S304: NO), following situations (1) and (2) can be assumed as described in steps S406, S308 and S309. Situation (1) is a case where transmission data from transmitting terminal 100 with synchronization information added to the IP header remains stored in access point 300 and has not been extracted yet. Situation (2) is a case where synchronization information is not periodically added to transmission data in transmitting terminal 100 because of a congestion avoidance phase or a similar state.

Thus, to reliably extract the transmission data, synchronization information processing section 235 immediately transfers the acknowledgment response with synchronization information added to transmission data transfer section 237 (S305). Thus, since receiving terminal 200 immediately transmits an acknowledgment response which becomes a trigger frame, receiving terminal 200 can receive all the data from transmitting terminal 100 stored in access point 300.

On the other hand, when synchronization information has been added to the TCP received data which becomes the acknowledgment response target (S304: YES), it is possible to assume that transmitting terminal 100 has decided that the state is a normal state of TCP communication. In this case, in order to finally determine whether or not receiving terminal 200 transitions to the power-saving mode, synchronization information processing section 235 transfers an acknowledgment response to transmission timing adjusting section 236 and transfers processing of setting a standby time of an acknowledgment response (S306).

Next, the method of setting a standby time of an acknowledgment response in transmission timing adjusting section 236 will be described in detail using FIG. 14.

Figure 14:
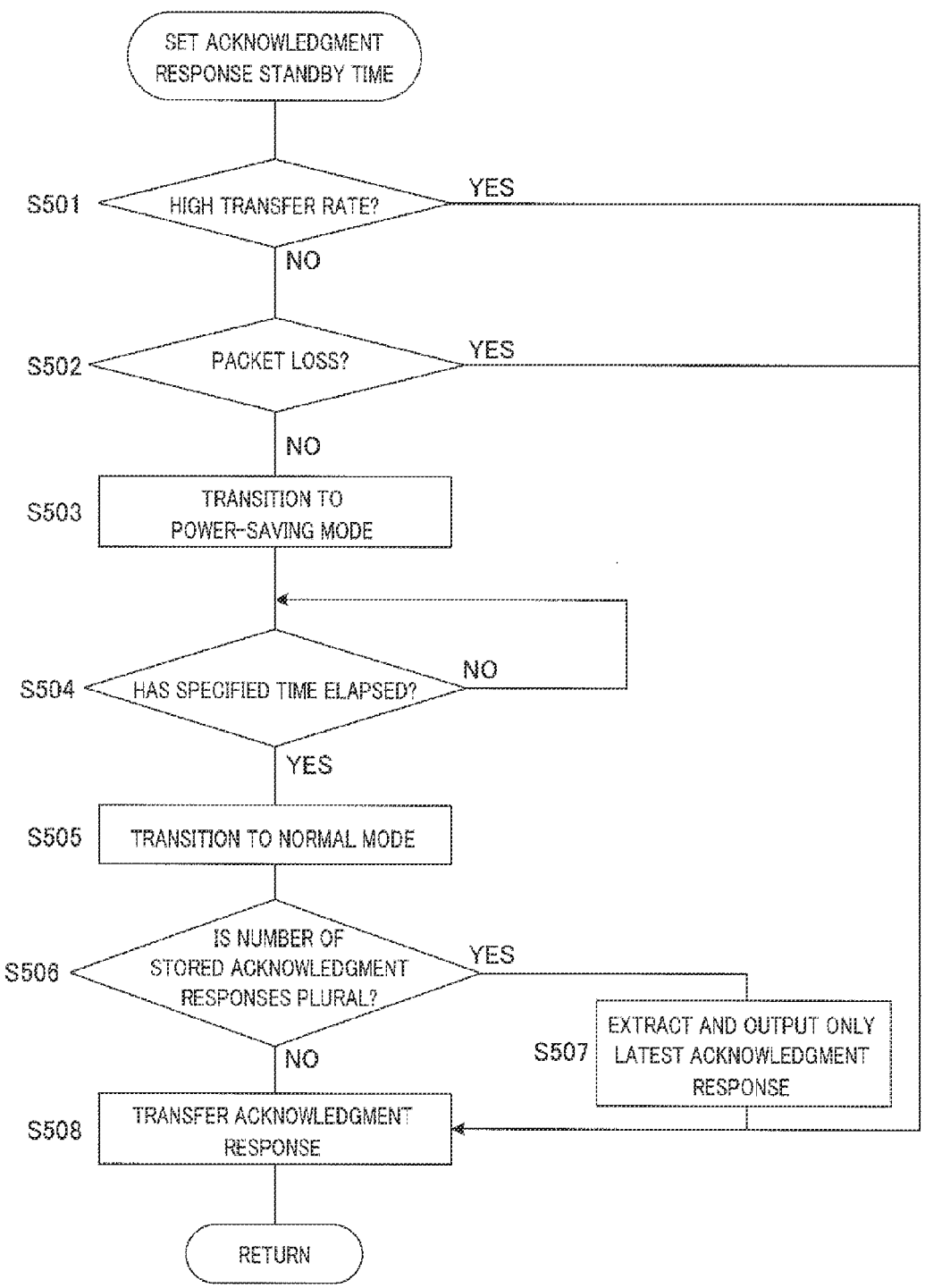
FIG. 14 is a diagram illustrating a processing flow of the transmission timing adjusting section.

FIG. 14 is a diagram illustrating a processing flow of transmission timing adjusting section 236.

Transmission timing adjusting section 236 decides whether or not the transfer rate in current communication is a high transfer rate based on the state of the transfer rate periodically notified from transfer rate decision section 233 (S501). For example, when an IEEE802.11g-compatible wireless LAN device is used, transmission timing adjusting section 236 decides whether or not the transfer rate is around 20 Mbps.

When the transfer rate is high (S501: YES), to maintain this transfer rate, transmission timing adjusting section 236 decides that no transition is made to the power-saving mode. Transmission timing adjusting section 236 then transfers the acknowledgment response with synchronization information added to the IP header to transmission data transfer section 237 (S508). Thus, the acknowledgment response is immediately notified to transmitting terminal 100.

On the other hand, when the transfer rate is not so high (S501: NO), transmission timing adjusting section 236 decides whether or not the transmission data has been lost due to packet loss (whether or not data transmitted from transmitting terminal 100 has normally arrived at receiving terminal 200) (S502). For example, transmission timing adjusting section 236 decides whether or not the acknowledgment response number remains equal between last time and this time, and can thereby decide packet loss. When packet loss is detected (S502: YES), transmission timing adjusting section 236 decides that no transition is made to the power-saving mode and transfers the acknowledgment response with synchronization information added to the IP header to transmission data transfer section 237 (S508). This causes the acknowledgment response to be immediately notified to transmitting terminal 100.

On the other hand, when no packet loss is detected and communication is normally carried out (S502: NO), transmission timing adjusting section 236 decides that a transition is made to the power-saving mode (S503).

After the transition to the power-saving mode, receiving terminal 200 waits on standby until a specified time elapses (S504). This specified time may be set by the user through communication application section 210 or transmission timing adjusting section 236 may statically manage a predetermined time.

After a lapse of the specified time from the transition to the power-saving mode, receiving terminal 200 transitions to the normal mode (active mode) (S505). Here, during the power-saving mode in step S503, subsequent acknowledgment responses may be sequentially transferred from TCP/IP control section 220. At this time, transmission timing adjusting section 236 decides whether or not the number of stored acknowledgment responses is plural (S506).

When the number of acknowledgment responses is plural (S506: YES), transmission timing adjusting section 236 extracts only the latest acknowledgment response transferred from TCP/IP control section 220 (S507). On the other hand, when the number of acknowledgment responses is not plural (S506: NO), transmission timing adjusting section 236 transfers the acknowledgment response with synchronization information added to the IP header to transmission data transfer section 237 (S508). Transmission timing adjusting section 236 may transfer an acknowledgment response to transmission data transfer section 237 after the transition to the normal mode or may transfer all acknowledgment responses.

Through such a series of processes on the receiving terminal 200 side, the receiving terminal 200 side controls the transition to the power-saving mode based on the synchronization information necessary for U-APSD set on the transmitting terminal 100 side. To be more specific, in a normal communication state and when synchronization information has been added to the transmission data from transmitting terminal 100, receiving terminal 200 repeatedly transitions to the power-saving mode. Thus, receiving terminal 200 can avoid such a state in which it is difficult to acquire U-APSD-compatible data arriving at access point 300. Furthermore, when stable communication is in progress, receiving terminal 200 can appropriately transition to the power-saving mode.

As described above, in transmitting terminal 100 according to the present embodiment, transmission header analyzing section 133 analyzes whether or not transmission data is an acknowledgment response in TCP communication based on the TCP header. When the transmission data is other than an acknowledgment response, synchronization preprocessing section 134 determines whether or not to add synchronization information necessary to operate with access point 300 in a U-APSD mode to the IP header of the transmission data based on the TCP header. This allows transmitting terminal 100 to control whether or not to use U-APSD without interrupting the data flow according to the TCP communication situation and efficiently transition to the power-saving mode.

Furthermore, in receiving terminal 200 according to the present embodiment, synchronization information processing section 235 adds synchronization information necessary to operate with access point 300 in a power-saving mode to the IP header of an acknowledgment response for data received from transmitting terminal 100. Received data decision section 231 decides whether or not synchronization information has been added to the IP header for the data received from transmitting terminal 100. Transmission timing adjusting section 236 controls transfer timing of the acknowledgment response with synchronization information added to the IP header according to the decision result in received data decision section 231. When synchronization information has not been added for the data received from transmitting terminal 100, transmission timing adjusting section 236 immediately transfers the acknowledgment response with synchronization information added to the IP header. Thus, according to the present embodiment, synchronization information is added to an acknowledgment response which becomes a trigger frame to reliably extract transmission data, and it is thereby possible to receive all data from transmitting terminal 100 stored in access point 300. Furthermore, according to the present embodiment, even when synchronization information is not added to the received data which becomes the acknowledgment response target and transmission data from transmitting terminal 100 remains stored in access point 300, the acknowledgment response with synchronization information added is immediately transmitted. As a result, according to the present embodiment, it is possible to reliably receive transmission data which may have been stored but may not have been extracted.

Figure 15:
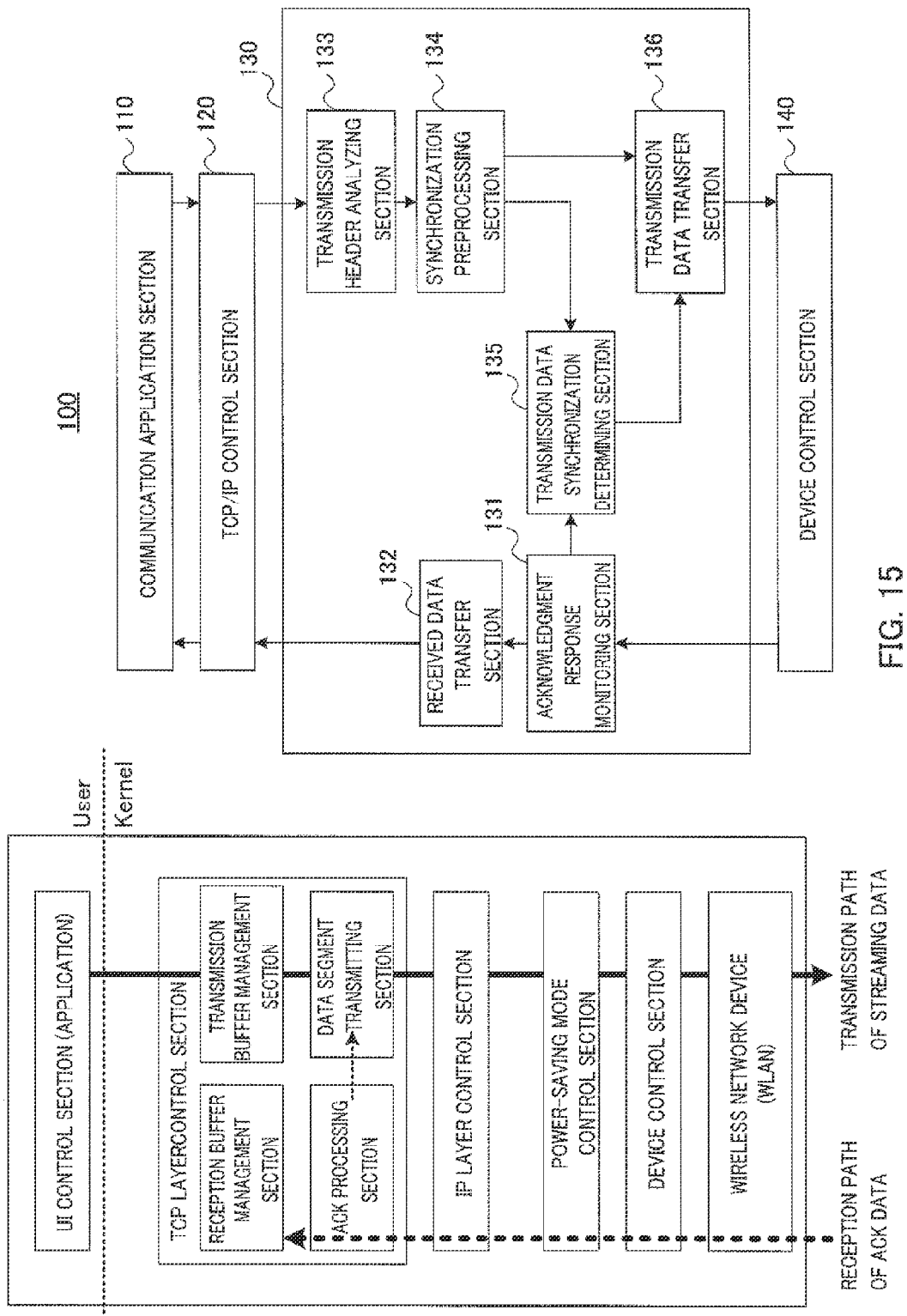
FIG. 15 is a diagram illustrating the correspondence between principal components of the data transmitting apparatus on the transmitting side according to the present embodiment and an OSI reference model.
Figure 16:
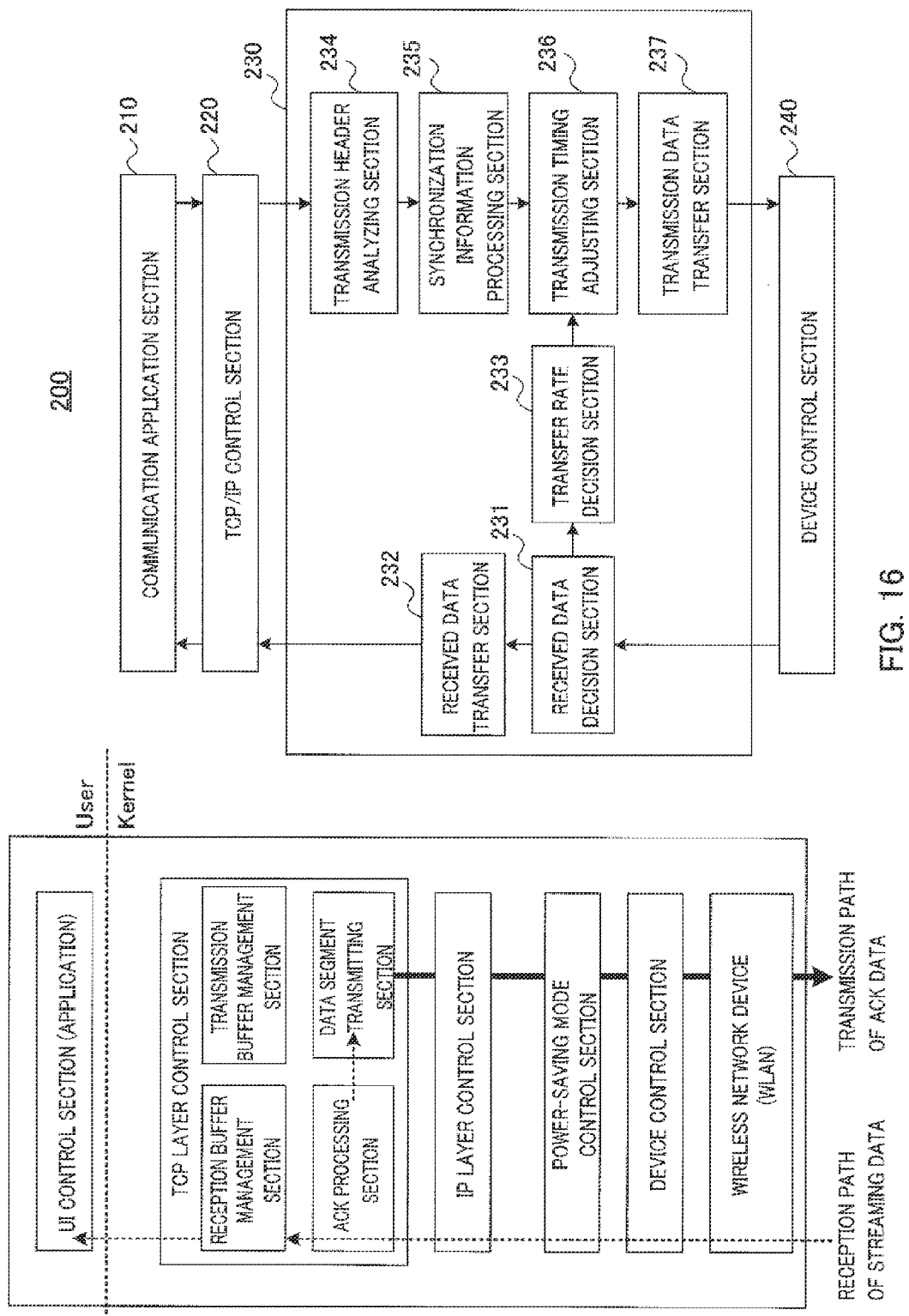
FIG. 16 is a diagram illustrating the correspondence between principal components of the data receiving apparatus on the receiving side according to the present embodiment and an OSI reference model.

FIG. 15 and FIG. 16 are diagrams illustrating the correspondence between principal components of the data transmitting apparatus on the transmitting side according to the present embodiment and an OSI (Open Systems Interconnection) reference model. Communication application sections 110 and 210 correspond to an application layer, a presentation layer and a session layer. TCP/IP control sections 120 and 220 correspond to a transport layer and a network layer. Device control section 140 corresponds to a data link layer. Power-saving mode control sections 130 and 230 control the power-saving mode in the network layer (or may also be the data link layer).

The above description presuppose that a wireless LAN is used for the wireless communication interface, but the present invention is not limited to this. Not only the wireless LAN but also any wireless system such as Bluetooth, Zigbee, WiMAX may be applicable as the wireless communication interface as long as it performs U-APSD-compliant operation and performs communication between a wireless terminal and an access point.

Furthermore, TCP/IP control sections 120 and 220, transmission header analyzing sections 133 and 234, synchronization preprocessing section 134, transmission data synchronization determining section 135, transmission data transfer sections 136 and 237, acknowledgment response monitoring section 131, received data transfer sections 132 and 232, synchronization information processing section 235, transmission timing adjusting section 236, transfer rate decision section 233, received data decision section 231, and device control sections 140 and 240 may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-227692, filed on Oct. 7, 2010, including the specification, drawings and abstract is incorporated herein by reference in its entirety.

INDUSTRIAL APPLICABILITY

The wireless communication system, data transmitting apparatus, data wireless receiving apparatus and wireless communication method according to the present invention can efficiently make a transition to a power-saving mode even when using U-APSD without interrupting a data flow in TCP communication. The present invention is applicable to a portable device such as a mobile phone or PDA (Personal Digital Assistants) and a personal computer.

REFERENCE SIGNS LIST

100 Transmitting terminal
110, 210 Communication application section
120, 220 TCP/IP control section
130, 230 Power-saving mode control section
131 Acknowledgment response monitoring section
132, 232 Received data transfer section
133, 234 Transmission header analyzing section
134 Synchronization preprocessing section
135 Transmission data synchronization determining section
136, 237 Transmission data transfer section
140, 240 Device control section
200 Receiving terminal
231 Received data decision section
233 Transfer rate decision section
235 Synchronization information processing section
236 Transmission timing adjusting section

The invention claimed is:
1. A wireless communication system comprising:
a data transmitting apparatus on a transmitting side;
a wireless base station that performs wired or wireless communication with the data transmitting apparatus; and
a data wireless receiving apparatus on a receiving side that TCP/IP-communicates transmission/received data including an IP header and a TCP header with the data transmitting apparatus via the wireless base station using a TCP/IP protocol, wherein:
the data transmitting apparatus comprises:
a transmission header analyzing section that analyzes, based on the TCP header of a first transmission data transmitted from the data transmitting apparatus to the data wireless receiving apparatus, whether or not the first transmission data is an acknowledgment response in a TCP communication;
a synchronization preprocessing section that determines, when the first transmission data is other than the acknowledgment response, whether or not to add to the IP header of the first transmission data, synchronization information necessary to operate with the wireless base station in a power-saving mode, the determination being based on the TCP header of the first transmission data; and
a transmission data transfer section that transfers the first transmission data including the IP header with the synchronization information added or not added, and
the data wireless receiving apparatus comprises:
a synchronization information processing section that adds synchronization information necessary to operate with the wireless base station in the power-saving mode, to the IP header of a second transmission data indicating the acknowledgment response to the received data received from the data transmitting apparatus, among transmission data transmitted from the data wireless receiving apparatus to the data transmitting apparatus;
a received data decision section that decides whether or not the synchronization information has been added to the IP header of the received data;

a transmission timing adjusting section that controls transfer timing of the second transmission data according to a decision result in the received data decision section; and a transmission data transfer section that transfers the second transmission data according to the transfer timing.

2. A data transmitting apparatus on a transmitting side that TCP/IP-communicates transmission/received data including an IP header and a TCP header with a data wireless receiving apparatus via wired or wireless communication with a wireless base station using a TCP/IP protocol, comprising:

a transmission header analyzing section that analyzes whether or not the transmission data is an acknowledgment response in a TCP communication, based on the TCP header of the transmission data transmitted from the data transmitting apparatus to the data wireless receiving apparatus;

a synchronization preprocessing section that determines, when the transmission data is other than the acknowledgment response, whether or not to add synchronization information necessary to operate with the wireless base station in a power-saving mode, to the IP header of the transmission data, the determination being based on the TCP header of the transmission data; and a transmission data transfer section that transfers the transmission data including the IP header with the synchronization information added or not added.

3. The data transmitting apparatus according to claim 2, further comprising:

a monitoring section that monitors a reception interval of the acknowledgment response transmitted from the data wireless receiving apparatus; and a transmission data synchronization determining section that finally determines to add the synchronization information when the reception interval is periodic.

4. The data transmitting apparatus according to claim 3, wherein:

the monitoring section further monitors a window size notified using the TCP header of the received data, and the transmission data synchronization determining section finally determines, when the reception interval is irregular, whether or not to add the synchronization information, according to a result of comparison between the notified window size and an initial value of the window size notified with SYN data indicating a request for starting the TCP communication.

5. The data transmitting apparatus according to claim 4, wherein the transmission data synchronization determining section further uses the reception of the acknowledgment response transmitted from the data wireless receiving apparatus as a trigger and determines not to add the synchronization information to the IP header of a leading transmission data among a plurality of items of transmission data to be transmitted.

6. The data transmitting apparatus according to claim 2, wherein the synchronization preprocessing section determines, when the transmission data is SYN or FIN data indicating a request for starting or ending the TCP communication, not to add the synchronization information.

7. The data transmitting apparatus according to claim 6, wherein the synchronization preprocessing section further determines not to add the synchronization information in the case of a congestion avoidance phase of the TCP communication.

8. The data transmitting apparatus according to claim 7, wherein the synchronization preprocessing section further determines not to add the synchronization information in the case where the transmission data is a transmission data by retransmission of the TCP communication.

9. A data wireless receiving apparatus on a receiving side that TCP/IP-communicates transmission/received data including an IP header and a TCP header with a data transmitting apparatus on a transmitting side via a wireless base station carrying out wired or wireless communication with the data transmitting apparatus using a TCP/IP protocol, comprising:

a synchronization information processing section that adds synchronization information necessary to operate with the wireless base station in a power-saving mode, to the IP header of an acknowledgment response transmission data indicating an acknowledgment response to the received data received from the data transmitting apparatus among transmission data transmitted from the data wireless receiving apparatus to the data transmitting apparatus;

a received data decision section that decides whether or not the synchronization information has been added to the IP header of the received data;

a transmission timing adjusting section that controls transfer timing of the acknowledgment response transmission data according to a decision result in the received data decision section; and a transmission data transfer section that transfers the acknowledgment response transmission data including the IP header with the synchronization information added, according to the transfer timing.

10. The data wireless receiving apparatus according to claim 9, wherein the transmission timing adjusting section immediately transfers, when the synchronization information has not been added to the IP header of the received data, the acknowledgment response transmission data including the IP header with the synchronization information added.

11. The data wireless receiving apparatus according to claim 9, wherein when the synchronization information has been added to the IP header of the received data, the transmission timing adjusting section delays transmission timing of the acknowledgment response transmission data including the IP header with the synchronization information added.

12. The data wireless receiving apparatus according to claim 11, further comprising a transfer rate decision section that decides a transfer rate based on a reception time difference in the received data between last time and this time, wherein:

the transmission timing adjusting section adjusts transmission timing of the acknowledgment response transmission data including the IP header with the synchronization information added, based on the transfer rate.

13. The data wireless receiving apparatus according to claim 11, wherein the transmission timing adjusting section adjusts the transmission timing of the acknowledgment response transmission data based on a result of comparison between an acknowledgment response number stored in the TCP header of the acknowledgment response transmission data this time and an acknowledgement response number stored in the TCP header of the acknowledgment response transmission data last time.

14. A wireless communication method whereby a data transmitting apparatus on a transmitting side and a data wireless receiving apparatus on a receiving side TCP/IP-communicate transmission/received data including an IP header and a TCP header via a wireless base station using a TCP/IP protocol, wherein:
the data transmitting apparatus:
analyzes, based on the TCP header of a first transmission data transmitted from the data transmitting apparatus to the data wireless receiving apparatus, whether or not the first transmission data is an acknowledgment response in a TCP communication,
determines, when the first transmission data is other than the acknowledgment response, whether or not to add synchronization information necessary to operate with the wireless base station in a power-saving mode, to the IP header of the first transmission data, the determination being based on the TCP header of the first transmission data, and
transmits the first transmission data including the IP header with the synchronization information added or not added, and the data wireless receiving apparatus:
adds synchronization information necessary to operate with the wireless base station in the power-saving mode, to the IP header of a second transmission data indicating the acknowledgment response to the received data received from the data transmitting apparatus, among transmission data transmitted from the data wireless receiving apparatus to the data transmitting apparatus,
decides whether or not the synchronization information has been added to the IP header of the received data,
controls transfer timing of the second transmission data according to a decision result of whether or not the synchronization information has been added to the IP header of the received data, and
transfers the second transmission data according to the transfer timing.

* * * * *